US012722806B2

(12) United States Patent
Mukae

(10) Patent No.: US 12,722,806 B2
(45) Date of Patent: *Sep. 1, 2026

(54) FLYING OBJECT COPING SYSTEM, MONITORING GROUND CENTER, COMMUNICATION ROUTE SEARCH DEVICE, FLIGHT PATH PREDICTION DEVICE, POLAR ORBIT SATELLITE SYSTEM, POLAR ORBIT SATELLITE, INCLINED ORBIT SATELLITE SYSTEM, AND INCLINED ORBIT SATELLITE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 374 days.

This patent is subject to a terminal disclaimer.

(21) Appl. No.: 18/276,046

(22) PCT Filed: Feb. 16, 2022

(86) PCT No.: PCT/JP2022/006103

§ 371 (c)(1),
(2) Date: Aug. 7, 2023

(87) PCT Pub. No.: WO2022/176891

PCT Pub. Date: Aug. 25, 2022

(65) Prior Publication Data

US 2024/0092507 A1 Mar. 21, 2024

(30) Foreign Application Priority Data

Feb. 19, 2021 (JP) ................................ 2021-024770

(51) Int. Cl.
*H04W 84/06* (2009.01)
*B64G 1/10* (2006.01)
(Continued)

(52) U.S. Cl.
CPC .......... *B64G 1/242* (2013.01); *B64G 1/1035* (2023.08); *B64G 1/1085* (2013.01)

(58) Field of Classification Search
CPC .... B64G 1/242; B64G 1/1035; B64G 1/1085; B64G 1/10; B64G 3/00; F41H 11/02;
(Continued)

(56) References Cited

U.S. PATENT DOCUMENTS 5,813,634 A 9/1998 Pizzicaroli et al.
7,875,837 B1 1/2011 Szabo et al.
(Continued)

FOREIGN PATENT DOCUMENTS

CN 106570253 B 12/2019
JP 2000-193741 A 7/2000
(Continued)

OTHER PUBLICATIONS

Office Action dated May 7, 2025 for corresponding Japanese patent application No. 2024-026799 (6 pages; with English translation).
(Continued)

*Primary Examiner* — Andrew Wendell
(74) *Attorney, Agent, or Firm* — XSENSUS LLP

(57) ABSTRACT

A monitoring system (404) includes a plurality of monitor satellites (307) and a monitoring ground center (810). A satellite information transmission system (403) includes a plurality of communication satellites including communication devices. A coping system (405) includes land, sea, and air coping assets to cope with a flying object. A flying object coping system (401) transmits flying object information, generated by the monitoring system (404) that monitors a
(Continued)

flying object (601), to the coping system (405) via the satellite information transmission system (403). The monitoring ground center (810) includes a communication route search device (811) and a flight path prediction device (803) and transmits order commands to a communication satellite cluster included in the satellite information transmission system (403).

28 Claims, 12 Drawing Sheets

(51) Int. Cl.
*B64G 1/24* (2006.01)
*H04B 7/185* (2006.01)

(58) Field of Classification Search
CPC ....... H04W 84/06; H04W 4/02; H04W 4/029; H04W 17/27; H04B 7/185; H04B 7/2693
See application file for complete search history.

(56) References Cited

U.S. PATENT DOCUMENTS

| | | | |
|---|---|---|---|
| 9,647,749 | B2 | 5/2017 | Krebs |
| 2010/0038490 | A1 | 2/2010 | Hofschuster et al. |
| 2012/0316819 | A1 | 12/2012 | Martell et al. |
| 2016/0094288 | A1 | 3/2016 | Krebs |
| 2016/0299506 | A1 | 10/2016 | Bruggeman et al. |
| 2018/0106898 | A1 | 4/2018 | Baskaran et al. |
| 2024/0092506 | A1 | 3/2024 | Mukae |

FOREIGN PATENT DOCUMENTS

| | | | |
|---|---|---|---|
| JP | 2008-137439 | A | 6/2008 |
| JP | 2011112284 | A | 6/2011 |
| JP | 2012220132 | A | 11/2012 |
| WO | 2020/261481 | A1 | 12/2020 |
| WO | 2022176890 | A1 | 8/2022 |

OTHER PUBLICATIONS

Office Action issued on Dec. 26, 2023, in Japanese patent Application No. 2023-500882, which corresponds to co-pending U.S. Appl. No. 18/276,041, 10 pages.
International Search Report mailed on Apr. 26, 2022, received for PCT Application PCT/JP2022/006101, filed on Feb. 16, 2022, 7 pages including English Translation.
International Search Report mailed on Apr. 26, 2022, received for PCT Application PCT/JP2022/006102, filed on Feb. 16, 2022, 7 pages including English Translation.
International Search Report mailed on Apr. 26, 2022, received for PCT Application PCT/JP2022/006103, filed on Feb. 16, 2022, 7 pages including English Translation.
International Search Report mailed on Apr. 5, 2022, received for PCT Application PCT/JP2022/006104, filed on Feb. 16, 2022, 5 pages including English Translation.
International Search Report mailed on Apr. 5, 2022, received for PCT Application PCT/JP2022/006107, filed on Feb. 16, 2022, 5 pages including English Translation.
Office Action dated Sep. 2, 2025 for the co-pending U.S. Appl. No. 18/276,041 (66 pages).
Office Action issued on Dec. 26, 2023, in corresponding Japanese patent Application No. 2023-500884, 9 pages.
Office Action dated Nov. 12, 2025 for the co-pending U.S. Appl. No. 18/276,040 (129 pages).
Office Action dated Jan. 30, 2026 for the co-pending U.S. Appl. No. 18/276,041 (135 pages)
Office Action issued on Jul. 7, 2026 in corresponding U.S. Appl. No. 18/276,041 (120 pages).

Fig. 2

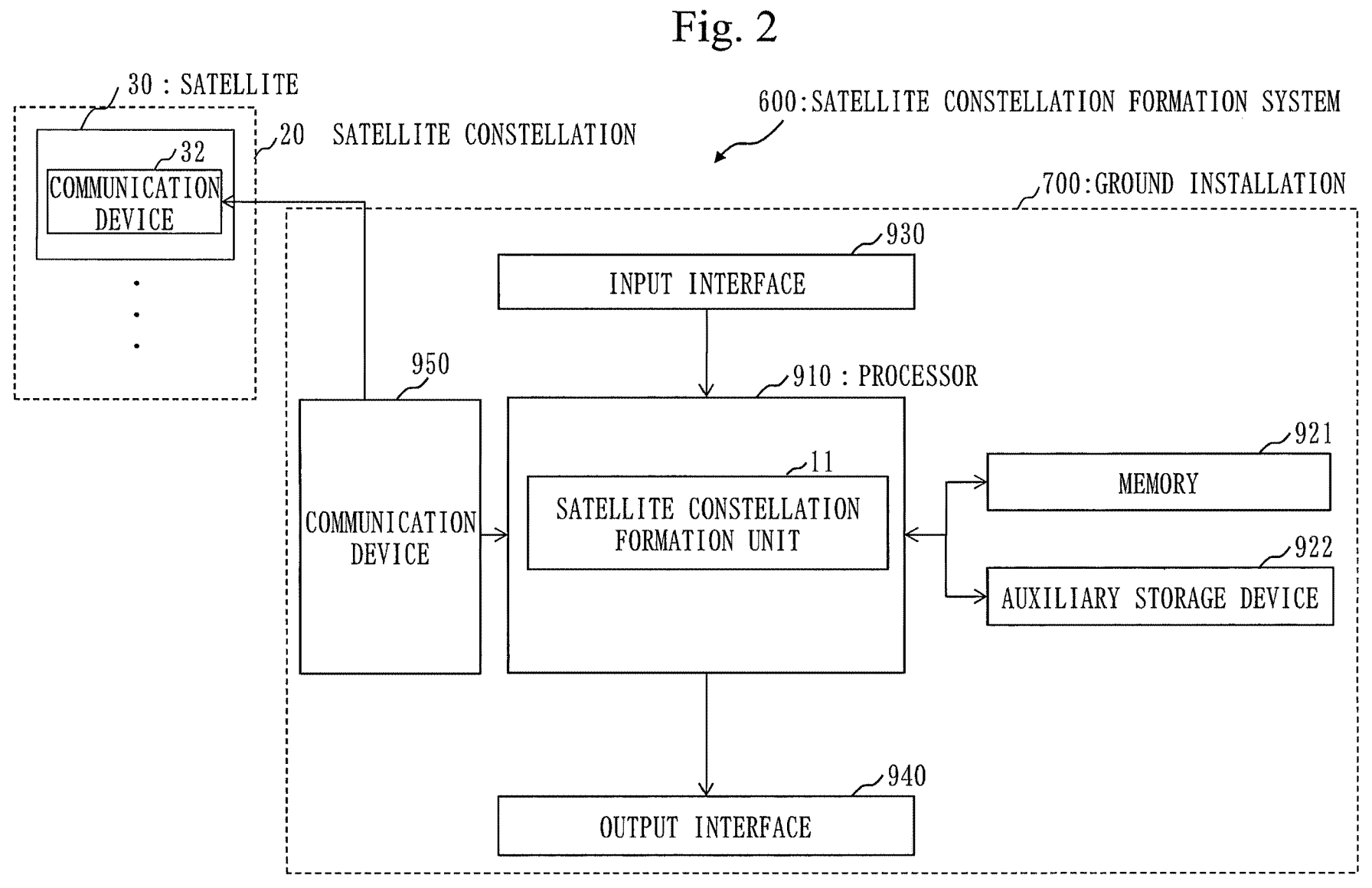

600:SATELLITE CONSTELLATION FORMATION SYSTEM

700:GROUND INSTALLATION

921 MEMORY

922 AUXILIARY STORAGE DEVICE

930 INPUT INTERFACE

910 : PROCESSOR

11 SATELLITE CONSTELLATION FORMATION UNIT

940 OUTPUT INTERFACE

950 COMMUNICATION DEVICE

20 SATELLITE CONSTELLATION

30 : SATELLITE

32 COMMUNICATION DEVICE

Figure 3:
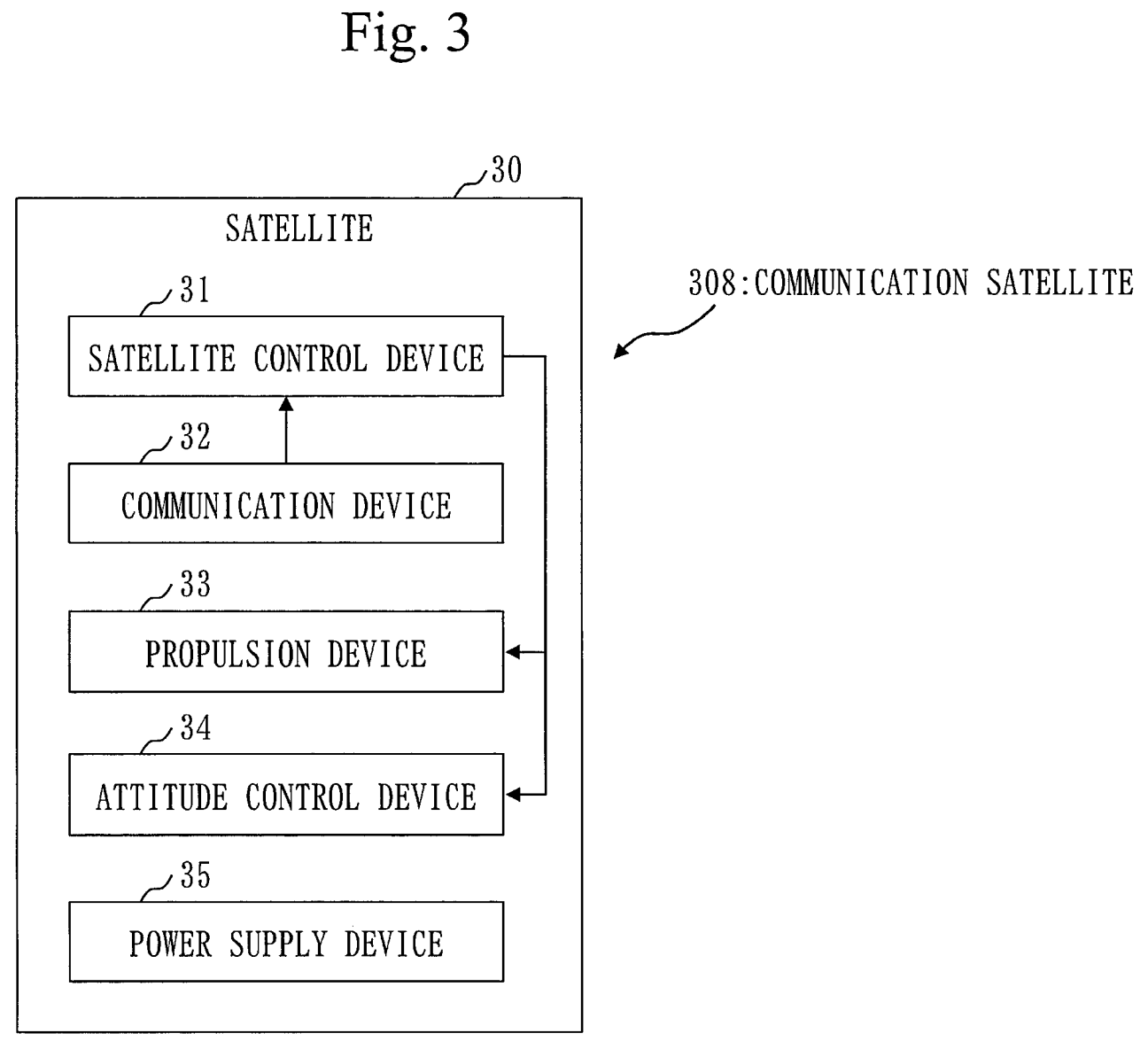

308: COMMUNICATION SATELLITE

30 SATELLITE

31 SATELLITE CONTROL DEVICE

32 COMMUNICATION DEVICE

33 PROPULSION DEVICE

34 ATTITUDE CONTROL DEVICE

35 POWER SUPPLY DEVICE

Fig. 5

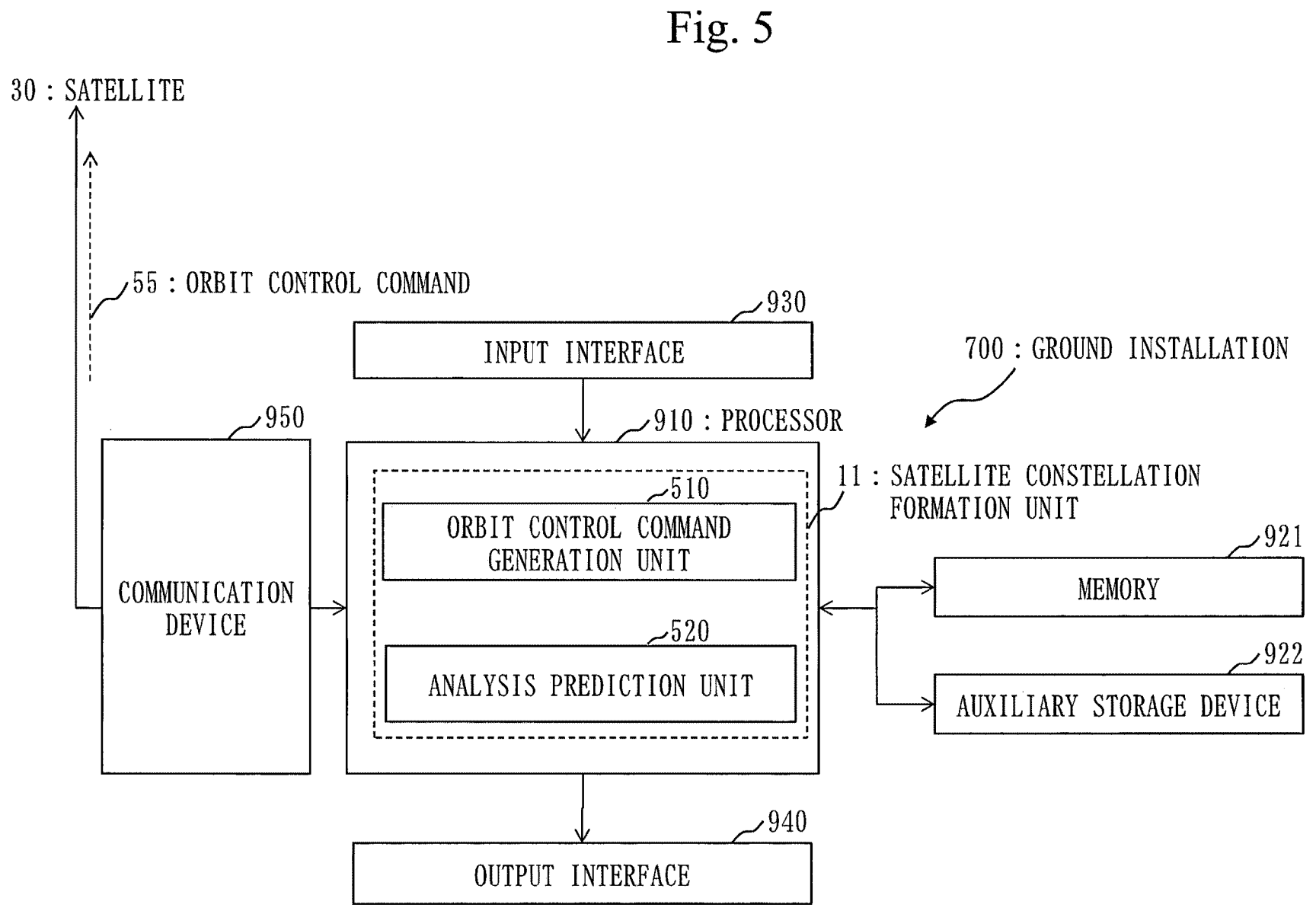

700 : GROUND INSTALLATION

11 : SATELLITE CONSTELLATION FORMATION UNIT

921 MEMORY

922 AUXILIARY STORAGE DEVICE

930 INPUT INTERFACE

910 : PROCESSOR

510 ORBIT CONTROL COMMAND GENERATION UNIT

520 ANALYSIS PREDICTION UNIT

940 OUTPUT INTERFACE

950 COMMUNICATION DEVICE

55 : ORBIT CONTROL COMMAND

30 : SATELLITE

Fig. 8

SPACE OBJECT ID
FORECAST EPOCH
FORECAST ORBITAL ELEMENT
ORBIT FORECAST INFORMATION
FORECAST ERROR

| SATELLITE ID | DEBRIS ID | EPOCH | SIX KEPLERIAN ORBITAL ELEMENTS | | | | | | PREDICTION ERROR | | |
|---|---|---|---|---|---|---|---|---|---|---|---|
| | | | MEAN MOTION | ECCENTRICITY | ORBIT INCLINATION | RAAN | ARGUMENT OF PERIGEE | MEAN ANOMALY | TRAVELING DIRECTION | ORTHOGONAL DIRECTION | BASIS |
| | | Epoch | Mean Motion | Eccentricity | Inclination | RAAN | Argument of Perigee | Mean Anomaly | | | |
| | | YEAR AND DATE | ROUND/DAY | NO UNIT | deg | deg | deg | deg | km | km | |
| A | | a1 | a2 | a3 | a4 | a5 | a6 | a7 | a8 | a9 | ON-ORBIT MEASURED VALUE |
| B | | b1 | b2 | b3 | b4 | b5 | b6 | b7 | b8 | b9 | ON-ORBIT MEASURED VALUE |
| C | | c1 | c2 | c3 | c4 | c5 | c6 | c7 | c8 | c9 | ANALYTICAL VALUE |
| D | | d1 | d2 | d3 | d4 | d5 | d6 | d7 | d8 | d9 | GROUND MEASURED VALUE |
| E | | e1 | e2 | e3 | e4 | e5 | e6 | e7 | e8 | e9 | GROUND MEASURED VALUE |
| F | | f1 | f2 | f3 | f4 | f5 | f6 | f7 | f8 | f9 | SSA MEASURED VALUE |
| | A | α1 | α2 | α3 | α4 | α5 | α6 | α7 | α8 | α9 | SSA MEASURED VALUE |
| | B | β1 | β2 | β3 | β4 | β5 | β6 | β7 | β8 | β9 | SSA MEASURED VALUE |
| | Γ | γ1 | γ2 | γ3 | γ4 | γ5 | γ6 | γ7 | γ8 | γ9 | SSA MEASURED VALUE |
| | Δ | δ1 | δ2 | δ3 | δ4 | δ5 | δ6 | δ7 | δ8 | δ9 | SSA MEASURED VALUE |

SATELLITE ORBIT FORECAST INFORMATION (rows A–F)
DEBRIS ORBIT FORECAST INFORMATION (rows A, B, Γ, Δ)

Fig. 10

441: ABOVE-EQUATOR SATELLITE SYSTEM

NORTH POLE

ABOVE-EQUATOR SATELLITE

EARTH

442:POLAR ORBIT SATELLITE SYSTEM

NORTH POLE

EARTH

443: INCLINED ORBIT SATELLITE SYSTEM

NORTH POLE

EARTH

21

FLYING OBJECT COPING SYSTEM, MONITORING GROUND CENTER, COMMUNICATION ROUTE SEARCH DEVICE, FLIGHT PATH PREDICTION DEVICE, POLAR ORBIT SATELLITE SYSTEM, POLAR ORBIT SATELLITE, INCLINED ORBIT SATELLITE SYSTEM, AND INCLINED ORBIT SATELLITE

The present application is based on PCT filing PCT/JP2022/006103, filed Feb. 16, 2022, which claims priority from Japanese Patent Application No. 2021-024770, filed Feb. 19, 2021. This application is also related to U.S. patent application Ser. No. 18/276,041, entitled FLYING OBJECT COPING SYSTEM, SATELLITE UNIFIED ORDERING CENTER, COMMUNICATION ROUTE SEARCH DEVICE, FLIGHT PATH PREDICTION DEVICE, ABOVE-EQUATOR SATELLITE SYSTEM, ABOVE-EQUATOR SATELLITE, INCLINED ORBIT SATELLITE SYSTEM, INCLINED ORBIT SATELLITE, UNIFIED DATA LIBRARY, AND SATELLITE CONSTELLATION, filed Feb. 16, 2022; U.S. patent application Ser. No. 18/276,051, entitled FLYING OBJECT COPING SYSTEM, DEFENSE INFORMATION INTEGRATION CENTER, COMMUNICATION ROUTE SEARCH DEVICE, AND FLIGHT PATH PREDICTION DEVICE, filed Feb. 16, 2022; U.S. patent application Ser. No. 18/276,043, entitled FLYING OBJECT COPING SYSTEM, SURVEILLANCE GROUND CENTER, COPING GROUND CENTER, COMMUNICATION ROUTE SEARCH DEVICE, FLIGHT PATH PREDICTION DEVICE, AND COPING ASSET SELECTION DEVICE, filed Feb. 16, 2022; U.S. patent application Ser. No. 18/276,040, entitled COMMUNICATION ROUTE SEARCH METHOD, GROUND SYSTEM, SURVEILLANCE SATELLITE CONSTELLATION, COMMUNICATION SATELLITE CONSTELLATION, FLYING OBJECT COPING SYSTEM, UNIFIED DATA LIBRARY, SATELLITE, AND SATELLITE CONSTELLATION, filed Feb. 16, 2022. The entire contents of each are incorporated herein by reference.

TECHNICAL FIELD

The present disclosure relates to a flying object coping system, a monitoring ground center, a coping ground center, a communication route search device, a flight path prediction device, a coping asset selection device, an above-equator satellite system, an above-equator satellite, a polar orbit satellite system, a polar orbit satellite, an inclined orbit satellite system, and an inclined orbit satellite.

BACKGROUND ART

In recent years with appearance of flying objects that glide with supersonic velocities, monitoring by satellites, such as detection of launch of a flying object, tracking of a flight path thereof, or prediction of a landing position thereof, has been expected.

As means to detect and track a flying object in a glide phase, detection with infrared of temperature increase due to atmospheric friction at time when the flying object plunges into atmosphere has been viewed as promising. Further, as means to detect a flying object in the glide phase with infrared, monitoring from a low-earth-orbit satellite cluster has been viewed as promising.

Patent Literature 1 discloses a monitor satellite to exhaustively monitor a region in a specific latitude in the whole spherical surface of the earth with a small number of satellite instruments orbiting in a low orbit.

CITATION LIST

Patent Literature

Patent Literature 1: JP 2008-137439 A

SUMMARY OF INVENTION

Technical Problem

In monitoring from a low orbit, a distance from an artificial satellite to a flying object is shorter compared with monitoring from a stationary orbit. Therefore, detection performance with infrared can be enhanced. Configurations of a monitoring device including an infrared monitoring device and of a communication satellite cluster and a data transmission method present challenges because a huge number of satellites are required for constant monitoring by LEO satellites and maintenance of communication lines and because flying positions of the LEO satellites move momentarily in contrast to geostationary satellites that appear to be almost fixed with respect to an earth fixed coordinate system.

It is an object of the present disclosure to detect launch of a flying object and to transmit flying object information in quasi-real time to a coping system with use of a monitoring system including a monitor satellite cluster including monitoring devices and a satellite information transmission system in which a communication network is formed of a communication satellite cluster.

Solution to Problem

A flying object coping system according to the present disclosure comprises

- a monitoring system including a plurality of monitor satellites including monitoring devices and communication devices and a monitoring ground center to transmit order commands to a monitor satellite cluster;
- a satellite information transmission system including a plurality of communication satellites including communication devices; and
- a coping system including land, sea, and air coping assets to cope with a flying object, wherein
- the flying object coping system transmits flying object information, generated by the monitoring system that monitors a flying object, to the coping system via the satellite information transmission system, and
- the monitoring ground center includes a communication route search device for satellite information and a flight path prediction device and transmits order commands to a communication satellite cluster included in the satellite information transmission system.

Advantageous Effects of Invention

In a flying object coping system according to the present disclosure, launch of a flying object can be detected and the flying object information can be transmitted in quasi-real time to the coping system with use of the monitoring system including the monitor satellite cluster including the monitoring devices and the satellite information transmission system in which a communication network is formed of the communication satellite cluster.

BRIEF DESCRIPTION OF DRAWINGS

FIG. 2 illustrates a configuration example of a satellite constellation formation system according to Embodiment 1.

FIG. 3 illustrates an example of a configuration of a satellite in the satellite constellation according to Embodiment 1.

FIG. 5 illustrates a configuration example of a ground installation included in the satellite constellation formation system according to Embodiment 1.

FIG. 8 illustrates a configuration example of orbit forecast information according to Embodiment 1.

FIG. 10 illustrates an example of an above-equator satellite system according to Embodiment 3.

FIG. 11 illustrates an example of a polar orbit satellite system according to Embodiment 4.

FIG. 12 illustrates an example of an inclined orbit satellite system according to Embodiment 5.

DESCRIPTION OF EMBODIMENTS

Figure 1:
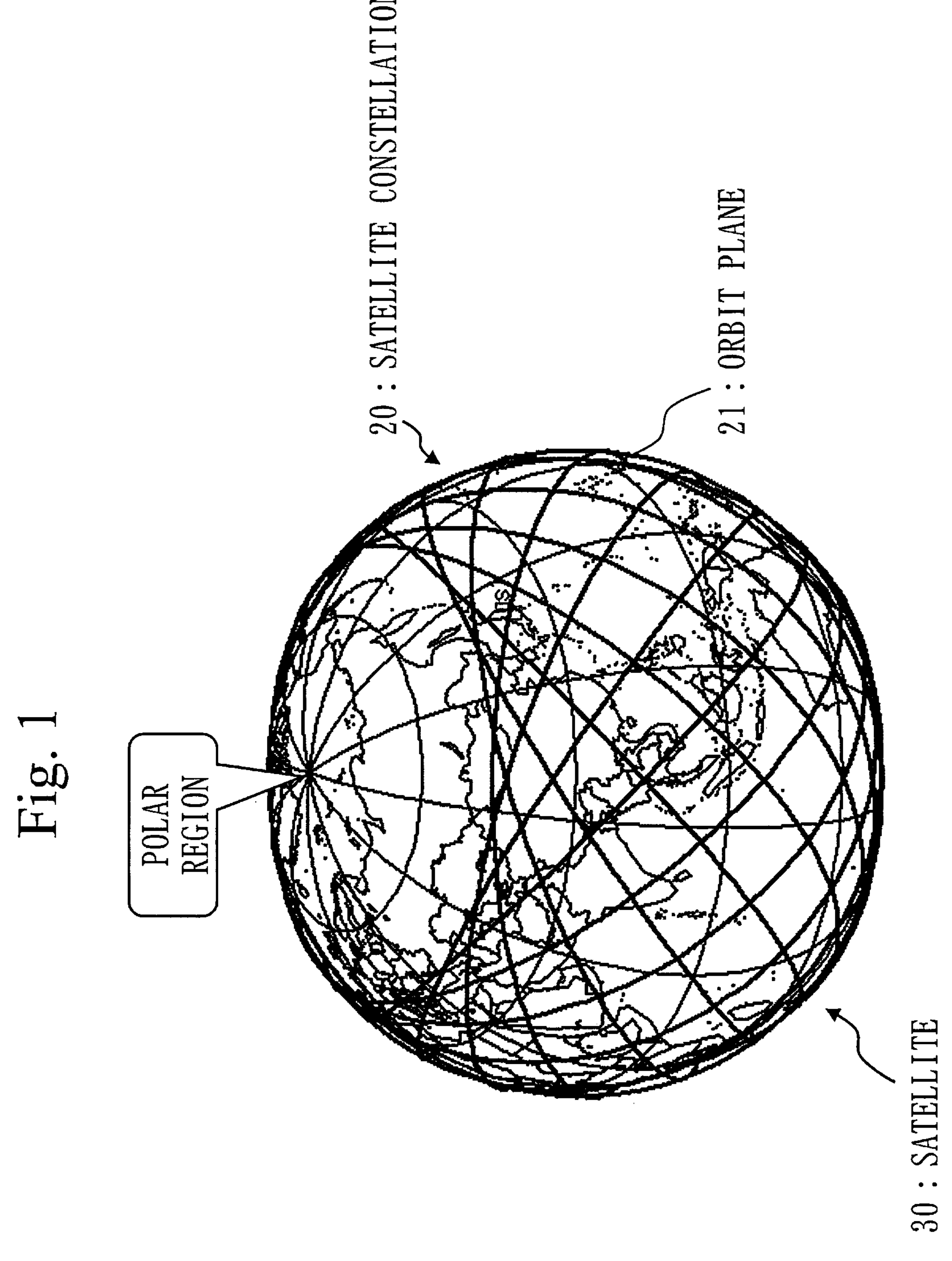
FIG. 1 illustrates an example of a satellite constellation having a plurality of orbit planes intersecting in regions other than polar regions.

Hereinbelow, embodiments of the present disclosure will be described with use of the drawings. Incidentally, in the drawings, identical parts or corresponding parts are provided with identical reference characters. In description of the embodiments, description of the identical parts or the corresponding parts is omitted or simplified appropriately. Further, relation among sizes of configurations in the following drawings may be different from actual relation. Further, in the description of the embodiments, directions or positions such as "upper", "lower", "left", "right", "ahead", "behind", "front", or "back" may be designated. Those expressions are given only for convenience of description and do not restrict placement and orientations of configurations such as devices, instruments, or components.

Embodiment 1

In the present embodiment, description will be given on a flying object coping system 401 including a monitoring system including a plurality of monitor satellites, a satellite information transmission system including a plurality of communication satellites, and a coping system including land, sea, and air coping assets to cope with flying objects.

As the flying object coping system 401, there exists a flying object coping system to detect spray (plume) at time of launching with an infrared observation device mounted in a geostationary orbit satellite, to predict landing based on traveling information in a flight initial phase, and to cope by the coping system, on a premise that a flying object makes a ballistic flight.

It has been possible to detect the spray at the time of launching, in which gas with an extremely high temperature spreads through a wide area, even by monitoring from a stationary orbit.

Recently, however, flying objects that are called HGV (Hypersonic Guided Vehicle) and that alter flight paths by intermittent jetting during flight have appeared and have become a new threat. In order to track a flying object during interruption in jetting, temperature detection for a main body of the flying object having increased in temperature is required and thus infrared monitoring with high resolution and high sensitivity is required.

Therefore, a monitoring system to monitor a flying object from a far shorter distance than from a stationary orbit by a satellite constellation of a low-earth-orbit (LEO) satellite cluster is expected. A contrivance to carry out constant monitoring by the LEO satellite constellation and to instantly convey information to coping assets after detection of launch of a flying object is hoped for.

Further, in addition to such a monitoring system including a monitor satellite cluster including infrared monitoring devices, a satellite information transmission system in which a mesh-like satellite constellation communication network is formed of a communication satellite cluster is expected. Means to detect launch of a flying object and to transmit flying object information in quasi-real time to a coping system with use of this satellite information transmission system is provided. Incidentally, reference as quasi-real time is made in consideration of time delay made for information transmission and waiting time to transfer of information at earliest timing from and to a satellite.

FIG. 1 is a diagram illustrating an example of a satellite constellation 20 having a plurality of orbit planes 21 intersecting in regions other than polar regions, as an example of the satellite constellation 20.

As described above, a monitoring system and a satellite information transmission system are formed as a satellite constellation.

In the satellite constellation 20 of FIG. 1, a plurality of satellites 30 fly on a same orbit plane and at a same altitude. The satellites 30 may be referred to as artificial satellites.

In the satellite constellation 20 of FIG. 1, an orbit inclination of each orbit plane 21 of the plurality of orbit planes is not about 90 degrees and the orbit planes 21 of the plurality of orbit planes exist on different planes. In the satellite constellation 20 of FIG. 1, arbitrary two orbit planes intersect at points other than points in the polar regions. As illustrated in FIG. 1, intersection points of a plurality of orbit planes inclined at orbit inclinations greater than 90 degrees deviate from the polar regions in accordance with the orbit inclinations. Further, depending on a combination of orbit planes, the orbit planes may intersect at various positions including vicinities of equator.

Other than the satellite constellation 20 of FIG. 1, there is a satellite constellation with a configuration in which an orbit inclination of each orbit plane of a plurality of orbit planes is about 90 degrees and in which the plurality of orbit planes intersect in vicinities of the polar regions.

With use of FIGS. 2 to 6, an example of a satellite 30 and a ground installation 700 in a satellite constellation formation system 600 that forms the satellite constellation 20 will be described. The satellite constellation formation system 600 may be simply referred to as satellite constellation.

FIG. 2 represents a configuration example of the satellite constellation formation system 600.

The satellite constellation formation system 600 includes a computer. Though FIG. 2 illustrates a configuration having one computer, each satellite 30 of the plurality of satellites that configure the satellite constellation 20 and the ground installation 700 to communicate with the satellites 30 are actually provided with respective computers. On that basis, the computers provided for the satellites 30 of the plurality of satellites and for the ground installation 700 to communicate with the satellites 30 cooperate to fulfil functions of the satellite constellation formation system 600. Hereinbelow, an example of a configuration of the computers that fulfil the functions of the satellite constellation formation system 600 will be described.

The satellite constellation formation system 600 includes the satellites 30 and the ground installation 700. The satellites 30 each include a communication device 32 to communicate with a communication device 950 of the ground installation 700. FIG. 2 illustrates the communication device 32 among configurations included in the satellites 30.

The satellite constellation formation system 600 includes a processor 910 and further includes other hardware such as a memory 921, an auxiliary storage device 922, an input interface 930, an output interface 940, and the communication device 950. The processor 910 is connected to other hardware via signal lines in order to control other hardware.

The satellite constellation formation system 600 includes a satellite constellation formation unit 11 as a functional element. Functions of the satellite constellation formation unit 11 are implemented by hardware or software.

The satellite constellation formation unit 11 controls formation of the satellite constellation 20 while communicating with the satellites 30.

FIG. 3 represents an example of a configuration of the satellites 30 in the satellite constellation formation system 600.

The satellites 30 each include a satellite control device 31, the communication device 32, a propulsion device 33, an attitude control device 34, and a power supply device 35. Though other components to fulfil various functions may be provided, the satellite control device 31, the communication device 32, the propulsion device 33, the attitude control device 34, and the power supply device 35 will be described in FIG. 3. The satellite 30 of FIG. 3 is an example of a communication satellite 308 including the communication device 32.

The satellite control device 31 is a computer to control the propulsion device 33 and the attitude control device 34 and includes a processing circuit. Specifically, the satellite control device 31 controls the propulsion device 33 and the attitude control device 34 in accordance with various commands transmitted from the ground installation 700.

The communication device 32 is a device to communicate with the ground installation 700. Alternatively, the communication device 32 is a device to communicate with the satellites 30 ahead and behind on the same orbit plane or the satellites 30 on adjacent orbit planes. Specifically, the communication device 32 transmits various types of data on the satellite to which itself belongs, to the ground installation 700 or another satellite 30. Additionally, the communication device 32 receives various commands transmitted from the ground installation 700.

The propulsion device 33 is a device to give a propulsive force to the satellite and changes a velocity of the satellite 30.

The attitude control device 34 is a device to control attitude elements such as an attitude of the satellite 30, an angular velocity of the satellite 30, and a line of sight. The attitude control device 34 changes the attitude elements in desired directions. Alternatively, the attitude control device 34 maintains the attitude elements in desired directions. The attitude control device 34 includes an attitude sensor, an actuator, and a controller. The attitude sensor is such a device as a gyroscope, an earth sensor, a sun sensor, a star tracker, a thruster, and a magnetic sensor. The actuator is such a device as an attitude control thruster, a momentum wheel, a reaction wheel, and a control moment gyro. The controller controls the actuator in accordance with measured data from the attitude sensor or various commands from the ground installation 700.

The power supply device 35 includes instruments such as a solar cell, a battery, and a power controller and supplies power to instruments mounted in the satellite 30.

The processing circuit provided in the satellite control device 31 will be described.

The processing circuit may be dedicated hardware or may be a processor to execute a program stored in a memory.

In the processing circuit, some functions may be implemented by dedicated hardware and the remaining functions may be implemented by software or firmware. That is, the processing circuit may be implemented by hardware, software, firmware, or a combination of those.

Specifically, the dedicated hardware is a single circuit, a composite circuit, a programmed processor, a parallelly programmed processor, an ASIC, an FPGA, or a combination of those.

ASIC is an abbreviation for Application Specific Integrated Circuit. FPGA is an abbreviation for Field Programmable Gate Array.

Figure 4:
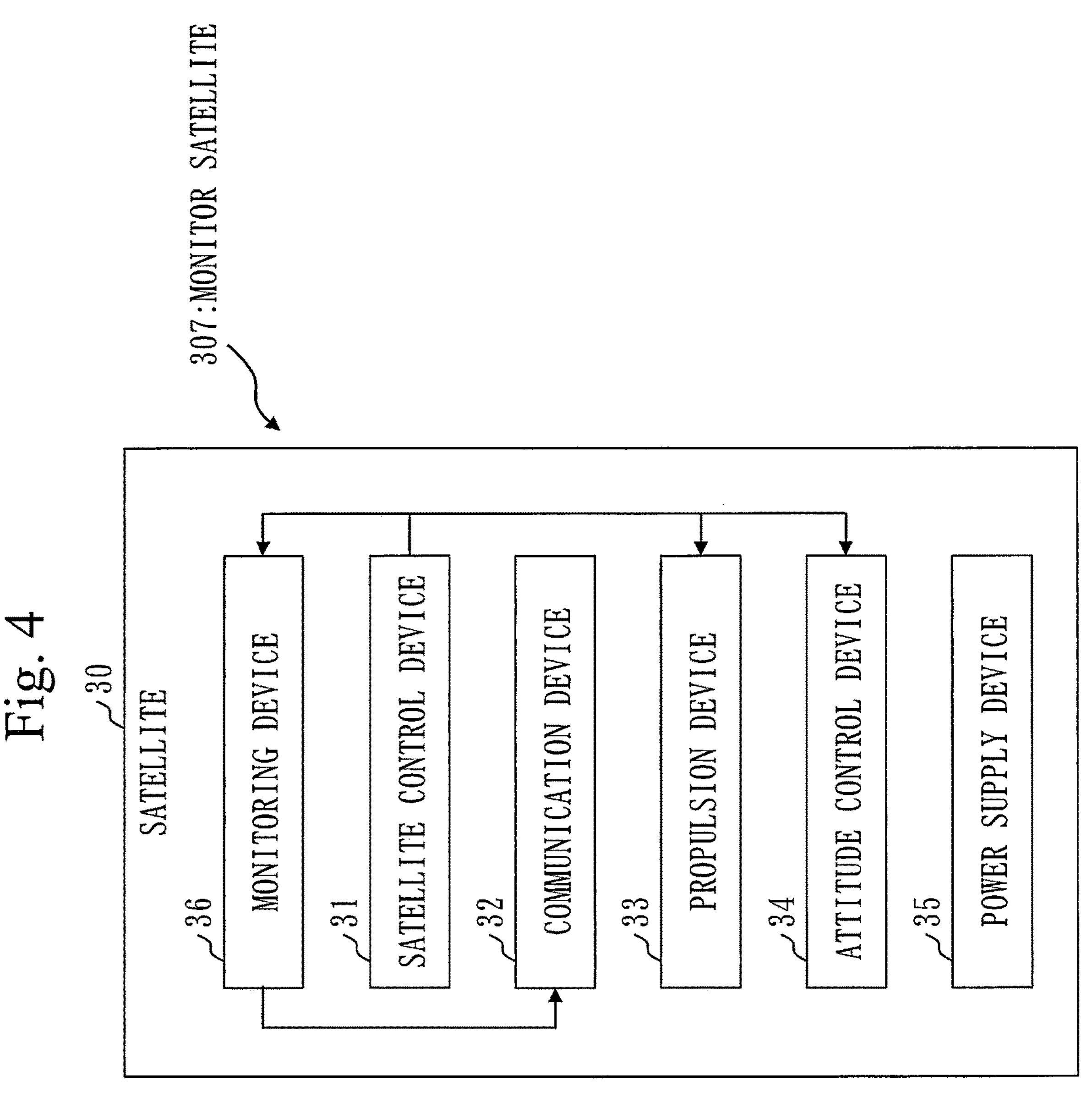
FIG. 4 illustrates another example of a configuration of a satellite in the satellite constellation according to Embodiment 1.

FIG. 4 represents another example of the configuration of the satellites 30 in the satellite constellation formation system 600.

The satellite 30 of FIG. 4 includes a monitoring device 36 in addition to the configuration of FIG. 3.

The monitoring device 36 is a device to monitor an object. Specifically, the monitoring device 36 is a device to monitor or observe such an object as a space object, a flying object, or a land, sea or air mobile object. The monitoring device 36 may be referred to as observation device.

For instance, the monitoring device 36 is an infrared monitoring device to detect, with infrared, a temperature increase due to atmospheric friction at time when a flying object plunges into atmosphere. The monitoring device 36 detects plume at time of launch of a flying object or a temperature of a main body of a flying object.

Alternatively, the monitoring device 36 may be an information gathering device for light waves or radio waves. The monitoring device 36 may be a device to detect an object by an optical system. The monitoring device 36 images an object, flying at an altitude different from an orbit altitude of an observation satellite, by the optical system. Specifically, the monitoring device 36 may be a visual optics sensor.

The satellite 30 of FIG. 4 is an example of a monitor satellite 307 including the monitoring device 36 and the communication device 32. The monitor satellite 307 may include a plurality of monitoring devices 36. Further, the monitor satellite 307 may include the monitoring devices 36 of a plurality of types.

FIG. 5 represents a configuration example of the ground installation 700 included in the satellite constellation formation system 600.

The ground installation 700 exerts program control over multiple satellites on all orbit planes. The ground installation 700 may be referred to as ground device or ground system. The ground device is made of a ground station such as a ground antenna device, a communication device connected to the ground antenna device, or an electronic computer and a ground installation as a server or a terminal connected to the ground station by a network. Further, the ground device may include a communication device mounted in a mobile object such as an aircraft, a self-propelled vehicle, or a mobile terminal.

The ground installation 700, that is, the ground system operates and controls a satellite constellation, a flying object coping system, a monitoring system, a satellite information transmission system, or a coping system to be described in embodiments of the present disclosure.

A hardware configuration of the ground installation 700, that is, the ground system is similar to that of a coping ground center or a monitoring ground center that are to be described in the embodiments of the present disclosure.

The ground installation 700 forms the satellite constellation 20 by communicating with the satellites 30. The ground installation 700 includes the processor 910 and further includes other hardware such as the memory 921, the auxiliary storage device 922, the input interface 930, the output interface 940, and the communication device 950. The processor 910 is connected to other hardware via the signal lines in order to control other hardware.

The ground installation 700 includes an orbit control command generation unit 510 and an analysis prediction unit 520 as functional elements. Functions of the orbit control command generation unit 510 and the analysis prediction unit 520 are implemented by hardware or software.

The communication device 950 transmits and receives signals to track and control the satellites 30 of the satellite cluster that configures the satellite constellation 20. Further, the communication device 950 transmits orbit control commands 55 to the respective satellites 30.

The analysis prediction unit 520 analyzes and predicts orbits of the satellites 30.

The orbit control command generation unit 510 generates the orbit control commands 55 to be transmitted to the satellites 30.

The orbit control command generation unit 510 and the analysis prediction unit 520 implement functions of the satellite constellation formation unit 11. That is, the orbit control command generation unit 510 and the analysis prediction unit 520 make an example of the satellite constellation formation unit 11.

Figure 6:
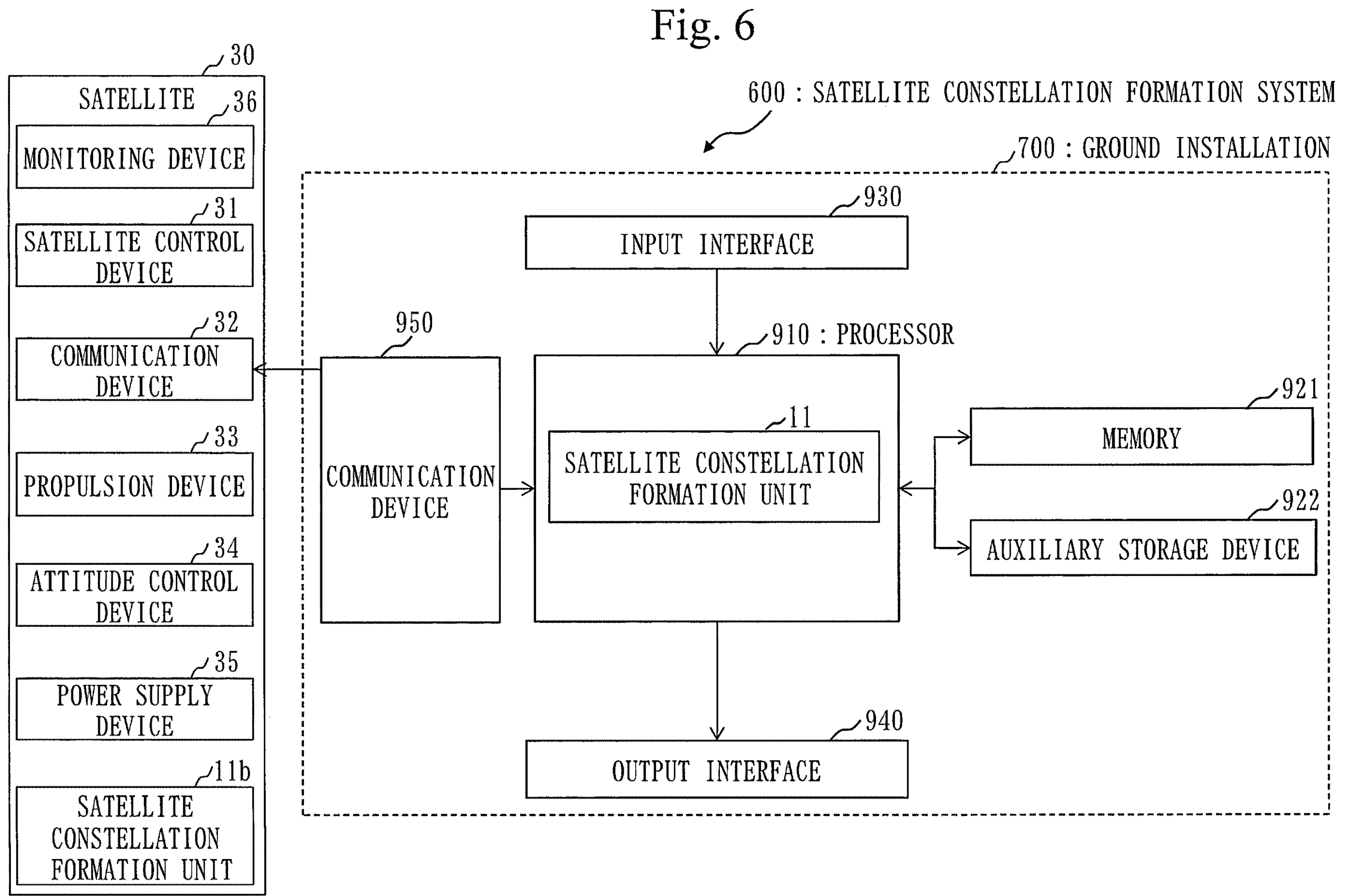
FIG. 6 illustrates a functional configuration example of the satellite constellation formation system according to Embodiment 1.

FIG. 6 is a diagram illustrating a functional configuration example of the satellite constellation formation system 600.

The satellite 30 further includes a satellite constellation formation unit 11*b* to form the satellite constellation 20. On that basis, the satellite constellation formation units 11*b* of the satellites 30 of the plurality of satellites and the satellite constellation formation units 11 provided in the ground installations 700 cooperate to fulfil the functions of the satellite constellation formation system 600. Incidentally, the satellite constellation formation units 11*b* of the satellites 30 may be included in the satellite control devices 31.

Figure 7:
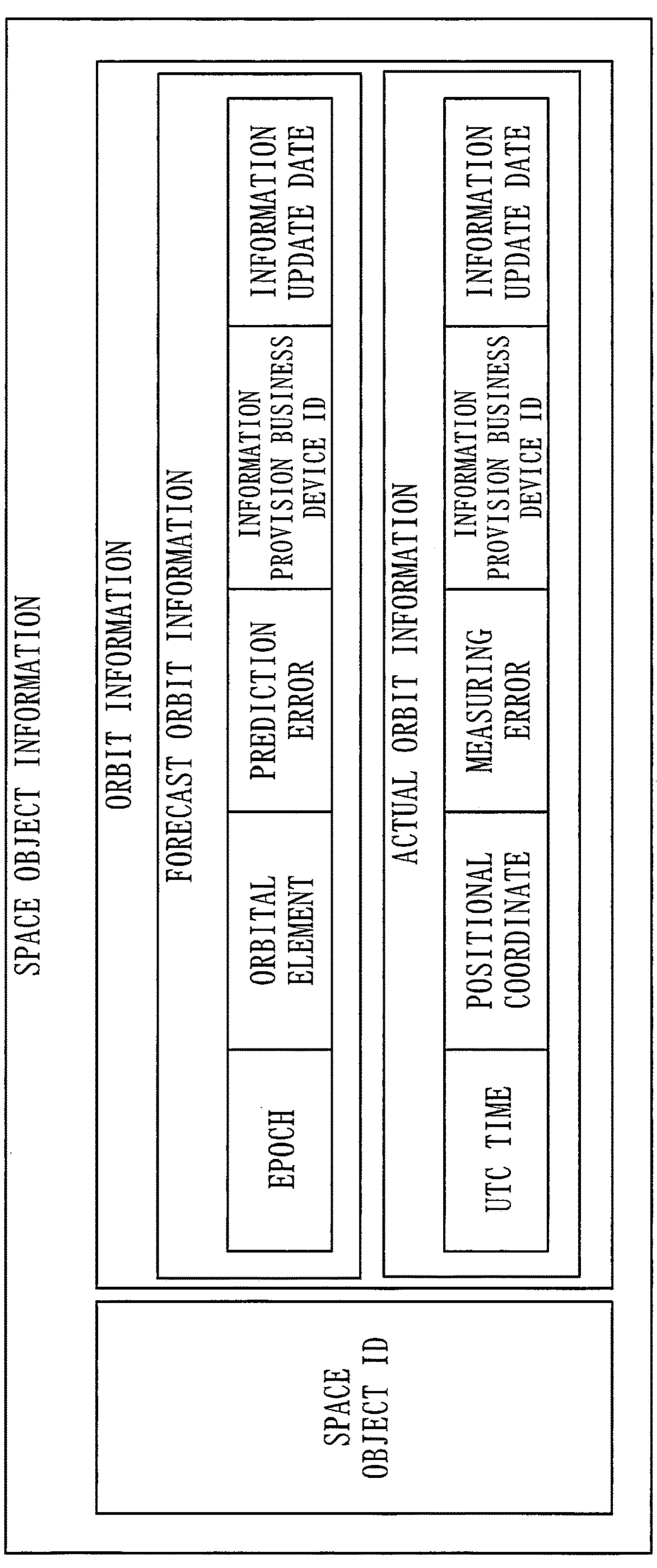
FIG. 7 illustrates a configuration example of space object information according to Embodiment 1.

FIG. 7 represents an example of space object information according to the present embodiment.

In the space object information, a space object ID (Identifier) for identification of a space object and orbit information are set up. In the orbit information, forecast orbit information and actual orbit information are included. For instance, the space object is a satellite.

The forecast orbit information includes epoch, orbital elements, prediction error, information provision business device ID, and information update date.

The actual orbit information includes UTC time, positional coordinate, measuring error, information provision business device ID, and information update date.

FIG. 8 is a diagram illustrating an example of orbit forecast information according to the present embodiment.

The satellite constellation formation system 600, the ground installation 700, or the satellites 30 are provided with the orbit forecast information in which forecast values of orbits of space objects are set up.

In the orbit forecast information, satellite orbit forecast information and debris orbit forecast information are included. In the satellite orbit forecast information, forecast values of orbits of the satellites are set up. In the debris orbit forecast information, forecast values of orbits of debris are set up.

In the orbit forecast information, information such as space object ID, forecast epoch, forecast orbital elements, and forecast errors is set up, for instance.

The space object ID is an identifier for identification of a space object. In FIG. 8, satellite IDs and debris IDs are set up as the space object IDs. Specifically, the space object is such an object as a rocket, a flying object, an artificial satellite, a space station, a debris removal satellite, or a planetary exploration spacecraft launched into outer space, or a satellite or a rocket having turned debris after end of mission.

The forecast epoch is an epoch forecast for an orbit of each of a plurality of space objects.

The forecast orbital elements are orbital elements that identify the orbit of each of the plurality of space objects. The forecast orbital elements are orbital elements forecast for the orbit of each of the plurality of space objects. In FIG. 8, six Keplerian orbital elements are set up as the forecast orbital elements.

The forecast errors are errors forecast for the orbit of each of the plurality of space objects. As the forecast errors, traveling direction error, orthogonal direction error, and basis of error are set up. Thus, error amounts, included in the actual values, along with basis thereof are explicitly stated as the forecast errors. As the basis of the error amounts, a portion or all of measurement means, contents of data processing carried out as accuracy improvement means for the positional coordinate information, and statistical assessment results on historical data are included.

Incidentally, the forecast epochs and the forecast orbital elements of space objects are set up in the orbit forecast information according to the present embodiment. Time and positional coordinates of a space object in near future can be found from the forecast epoch and the forecast orbital elements. The time and the positional coordinates of the space object in the near future may be set up in the orbit forecast information, for instance.

In the orbit forecast information, in this manner, the orbit information on the space objects including the epochs and the orbital elements or the time and the positional coordinates are provided and the forecast values for the space objects in the near future are explicitly stated.

Meanwhile, the satellite constellation formation system 600, the ground installation 700, or the satellites 30 may be provided with orbit actual information in which actual values of the orbits of the space objects are set up.

*Description of Configuration and Effects of Flying Object Coping System 401*****

Figure 9:
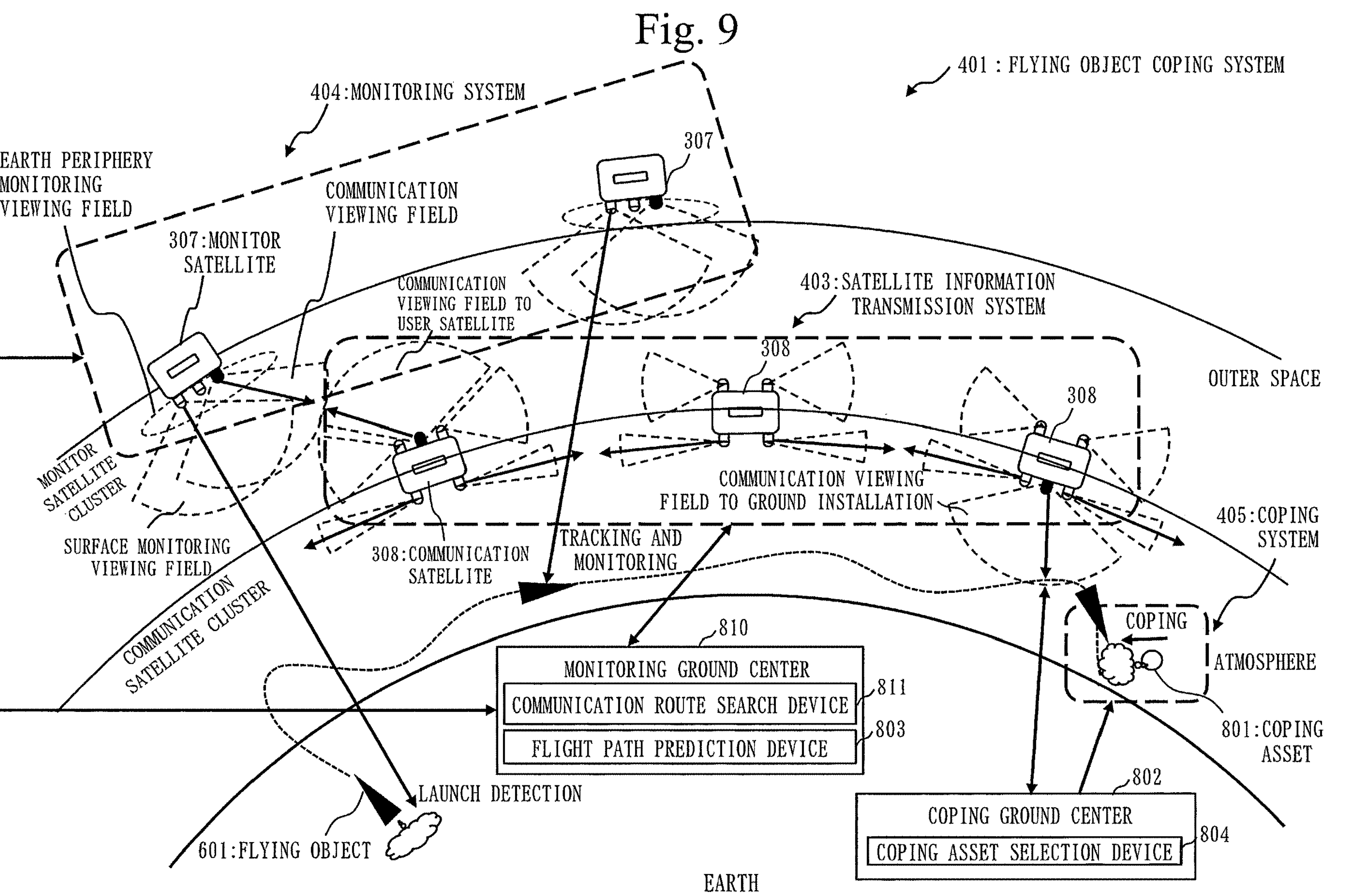
FIG. 9 illustrates a configuration example of a flying object coping system according to Embodiment 1.

FIG. 9 is a diagram illustrating a configuration example of the flying object coping system 401 according to the present embodiment.

In the present embodiment, the flying object coping system 401 includes a monitoring ground center 810 to control a monitor satellite cluster of a monitoring system 404 and to dominate a satellite information transmission system 403 that is a communication system.

After a monitor satellite detects launch of a flying object 601, conveyance of positional coordinates is required in order for a monitor satellite cluster flying in vicinities to continue acquiring information on the flying object 601. According to the flying object coping system 401 according to the present embodiment, monitor orders can be given to the monitor satellite cluster via a communication satellite passing through a vicinity.

With use of FIG. 9, the flying object coping system 401 according to the present embodiment will be described.

The flying object coping system 401 includes the monitoring system 404, the satellite information transmission system 403, and a coping system 405.

The monitoring system 404 is made of a plurality of monitor satellites 307 including the monitoring devices and the communication devices and the monitoring ground center 810 to transmit order commands to the monitor satellite cluster.

The satellite information transmission system 403 includes the plurality of communication satellites 308 including the communication devices.

The coping system 405 includes land, sea, and air coping assets 801 to cope with the flying object 601.

The flying object coping system 401 transmits flying object information, generated by the monitoring system 404 that monitors the flying object 601, to the coping system 405 via the satellite information transmission system 403.

Further, the monitoring ground center 810 includes a communication route search device 811 to search for a communication route for satellite information and a flight path prediction device 803. The monitoring ground center 810 transmits order commands to the communication satellite cluster included in the satellite information transmission system 403.

Further, the monitoring system 404 includes the plurality of monitor satellites 307 including infrared monitoring devices. The monitoring system 404 detects plume at time of launch of the flying object 601 and the flying object 601 flying with increase in temperature, as high-temperature targets. Then, the monitoring system 404 transmits time information and positional information on the flying object 601, as the flying object information.

Specifically, the monitor satellite 307 detects the plume at the time of launch of the flying object 601 and the flying object 601 flying with the increase in temperature, as the high-temperature targets, with use of the infrared monitoring device. Then, the monitoring system 404 transmits the flying object information including the time information and the positional information on the flying object 601, to the coping system 405 via the satellite information transmission system 403.

Herein, variations of flying object coping methods in the flying object coping system 401 will be described.

<Flying Object Coping Method Example 1>

The communication satellites included in the satellite information transmission system 403 form a communication network with a communication cross-link through the communication devices. A bidirectional communication link may be referred to as communication cross-link.

The monitoring ground center 810 searches for a shortest route for information transmission with use of the communication route search device 811 and transmits information transmission orders to communication satellites that are to form a communication path.

<Flying Object Coping Method Example 2>

After a monitor satellite A included in the monitoring system 404 detects launch of the flying object 601, the monitoring ground center 810 transmits launch time and positional coordinates of the flying object 601 as the flying object information to the coping system 405.

<Flying Object Coping Method Example 3>

The monitoring ground center 810 searches for a shortest route in the communication network from positional coordinates where the monitor satellite A has emitted the flying object information to positional coordinates of the coping system 405 with use of the communication route search device 811 and transmits the information transmission orders to a communication satellite cluster on the communication path. The communication satellite cluster on the communication path transmits the launch time and the positional coordinates of the flying object 601 as the flying object information to the coping system 405, based on the information transmission orders.

<Flying Object Coping Method Example 4>

The monitoring ground center 810 transmits the flying object information via the satellite information transmission system 403 to a monitor satellite cluster flying in vicinities of the monitor satellite A after launch of a flying object. After a monitor satellite B detects a high-temperature target, a search for a shortest route in the communication network from positional coordinates of a monitor satellite B to the positional coordinates of the coping system 405 is made with use of the communication route search device 811. Then, the monitoring ground center 810 transmits the information transmission orders to a communication satellite cluster on the communication path. The communication satellite cluster on the communication path transmits detection time, positional coordinates, and luminance information of the high-temperature target, as flying object information, to the coping system 405, based on the information transmission commands.

The monitoring ground center 810 transmits the flying object information via the satellite information transmission system 403 to a monitor satellite cluster flying in vicinities of the monitor satellite B. In case where a monitor satellite C detects a high-temperature target, a search for a shortest route in the communication network from positional coordinates of the monitor satellite C to the positional coordinates of the coping system 405 is made with use of the communication route search device 811. Then, the monitoring ground center 810 transmits the information transmission orders to a communication satellite cluster on the communication path. The communication satellite cluster on the communication path transmits detection time, positional coordinates, and luminance information of the high-temperature target, as flying object information, to the coping system 405, based on the information transmission commands.

The monitoring ground center 810 transmits the flying object information via the satellite information transmission system 403 to a monitor satellite cluster flying in vicinities of the monitor satellite N. In case where a monitor satellite N+1 detects a high-temperature target, a search for a shortest route in the communication network from positional coordinates of the monitor satellite N+1 to the positional coordinates of the coping system 405 is made with use of the communication route search device 811. Then, the monitoring ground center 810 transmits the information transmission orders to a communication satellite cluster on the communication path. The communication satellite cluster on the communication path transmits detection time, positional coordinates, and luminance information of the high-temperature target, as flying object information, to the coping system 405, based on the information transmission commands.

<Flying Object Coping Method Example 5>

The coping system 405 is made of the plurality of coping assets 801 and a coping ground center 802. The monitoring ground center 810 includes the flight path prediction device 803. The monitoring ground center 810 generates flight path prediction information made of time and positional information in future with use of the flight path prediction device 803 based on transition of time-series positional information in the flying object information received from the monitoring system 404. The coping ground center 802 includes a coping asset selection device 804 and is connected to the coping assets 801 by communication lines. The flight path prediction device 803 included in the monitoring ground center 810 transmits the flight path prediction information via the satellite information transmission system 403 to the coping ground center 802. The coping asset selection device 804 included in the coping ground center 802 selects a coping asset 801 existing in a vicinity of positional coordinates at which passage or arrival of a flying object is predicted based on the flight path prediction information and transmits order signals for coping behavior.

The flight path prediction device 803 predicts a traveling direction of the flying object and generates the flight path prediction information, based on the positional coordinates of the monitor satellite B, the monitor satellite C, the monitor satellite N, or the monitor satellite N+1 that has detected the high-temperature target after transmission of launch detection information from the monitor satellite A.

The coping asset selection device 804 selects a coping asset located in a vicinity based on the flight path prediction information from among the plurality of coping assets 801 differing in the positional coordinates. Then, the coping ground center 802 transmits the flying object information and a coping behavior order to the coping asset 801.

<Flying Object Coping Method Example 6>

The coping system 405 includes a plurality of coping ground centers 802 that differ in positional coordinates.

The monitoring ground center 810 transmits the flying object information, based on launch detection by the monitor satellite A, to all the coping ground centers 802.

The monitoring ground center 810 transmits the flying object information to a coping ground center 802 located in the vicinity based on the flight path prediction information generated by the flight path prediction device 803.

Subsequently, the communication route search device 811 included in the monitoring ground center 810 will be described.

<Function Example 1 of Communication Route Search Device 811>

The communication route search device 811 acquires communication starting time, positional coordinates, and positional coordinates of a destination to which the flying object information is to be transmitted, as input conditions. The communication route search device 811 searches for an optimum route in which satellite IDs that are transmission destinations of the flying object information are linked, under such input conditions. The communication route search device 811 produces a list in which the series of satellite IDs and forecast time when relevant satellites are to transmit the flying object information to subsequent satellites are enumerated and commands to provide communication orders for the relevant communication satellite cluster, as products.

Specifically, the communication route search device 811 searches for an optimum route for transmission of the flying object information in a shortest period of time, with inclusion of prediction errors of an actual orbit relative to a scheduled orbit in flight positions of a communication satellite, prediction time errors in passage through specific positional coordinates, delay resulting from information transmission, satellite travel distance associated with prediction error and delay time, and relative positional change among vicinity passing satellites resulting from satellite travel in analysis objects for route search.

<Function Example 2 of Communication Route Search Device 811>

The communication route search device 811 uses launch detection signals from a monitor satellite 307 as a communication start order and acquires positional coordinates of the monitor satellite 307 having emitted the launch detection signals, positional coordinates at which launch of a flying object has been detected, and viewing field alteration ranges for the monitor satellites, as input conditions. The communication route search device 811 searches for an optimum route in which satellite IDs that are transmission destinations of the flying object information are linked, under such input conditions. The communication route search device 811 produces a list in which the series of satellite IDs and forecast time when relevant satellites are to transmit the flying object information to subsequent satellites are enumerated and commands to provide communication orders for the relevant communication satellite cluster, as products. The positional coordinates of a launch site of the flying object are positional coordinates detected by the monitor satellite, having initially detected the launch, with use of a nadir-viewing monitoring device. Accordingly, "positional coordinates of the monitor satellite having emitted the launch detection signals, positional coordinates at which launch of a flying object has been detected" are almost adjacent to each other. There occurs a difference equivalent to a flight distance of the monitor satellite corresponding to a time lag from the detection of the launch of the flying object to transmission of the launch detection signals.

Specifically, the communication route search device 811 searches for a vicinity passing monitor satellite ID capable of monitoring vicinities of the launch site of the flying object even with viewing field alteration and makes searches for flying object information transmission time, the monitor satellite ID, and an optimum route for transmission of the flying object information to the monitor satellite ID.

<Function Example 3 of Communication Route Search Device 811>

The communication route search device 811 uses the launch detection signals from the monitor satellite 307 as the communication start order and acquires the positional coordinates of the monitor satellite 307 having emitted the launch detection signals, the positional coordinates at which the launch of the flying object has been detected, and the viewing field alteration ranges for the monitor satellites, as well as positional coordinates of a monitor satellite having emitted high-temperature detection signals, among the vicinity passing monitor satellites to which the flying object information has been transmitted, positional coordinates at which the high-temperature object has been detected, and viewing field alteration ranges for the monitor satellites, as input conditions. The communication route search device 811 searches for an optimum route in which satellite IDs that are transmission destinations of the flying object information are linked, under such input conditions. The communication route search device 811 produces a list in which the series of satellite IDs and forecast time when relevant satellites are to transmit the flying object information to subsequent satellites are enumerated and commands to provide communication orders for the relevant communication satellite cluster, as products. The "positional coordinates of a monitor satellite having emitted high-temperature detection signals, positional coordinates at which the high-temperature object has been detected" are detected by a limb monitoring device directed to earth periphery. In this case, a distance between the positional coordinates of the monitor satellite and the positional coordinates of the flying object is made extremely long.

Specifically, the communication route search device 811 searches for a vicinity passing monitor satellite ID capable of monitoring vicinities of a high-temperature object detected position even with the viewing field alteration and makes searches for the flying object information transmission time, the monitor satellite ID, and the optimum route for transmission of the flying object information to the monitor satellite ID.

Description of Functions of Present Embodiment

In the present embodiment, the flying object coping system 401 includes the monitoring ground center 810 to control a monitor satellite cluster of the monitoring system 404 and to dominate the satellite information transmission system 403 that is a communication system.

After a monitor satellite detects the launch of the flying object 601, the conveyance of the positional coordinates is required in order for the monitor satellite cluster flying in the vicinities to continue acquiring the information on the flying object 601. According to the flying object coping system 401 of the present embodiment, the monitor orders can be given to the monitor satellite cluster via a communication satellite passing through the vicinity.

For transmission of the flying object information from the monitor satellite having detected the launch to a coping asset, a search for an optimum route in the communication satellite cluster constructing a mesh communication network is required. Therefore, the flying object coping system 401 according to the present embodiment includes the communication route search device 811.

Further, tracking and monitoring a path of flight of the flying object by a plurality of monitor satellites and predicting a direction of the flight are required. Therefore, the flying object coping system 401 according to the present embodiment includes the flight path prediction device 803.

Further, on an assumption of mobile objects deployed in land, sea, and air and ground-fixed assets as the coping assets 801, direct tasking to each coping asset is enabled under a central administration system of the monitoring ground center 810. In other cases, however, it is rational to specify the coping ground center 802 and to perform tasking from the coping ground center 802 to each of the coping assets 801 after batch transmission of the flying object information.

Realistically, it is rational to select a coping ground center 802 placed in a relevant direction and to transmit the flying object information thereto in accordance with the flight path prediction for the flying object because the plurality of coping ground centers 802 are scattered. Therefore, the flying object coping system 401 according to the present embodiment includes the coping asset selection device 804. Incidentally, the coping ground centers 802 may be ships.

Incidentally, it is conceived that calling for attention with transmission of the initial detection information on launch to all of the coping ground centers 802 is rational.

Tracking by the monitor satellite cluster following the detection of launch of a flying object will be described.

Both the monitoring system 404 and the satellite information transmission system 403 treat launch detection positional coordinates (x0, y0, z0) at time t0 of launch detection, as positional coordinates of a launch site. In the flying object coping system 401, at this time, it is necessary to issue orders of continuous flying object monitoring via a communication satellite passing through a vicinity of the positional coordinates (x0, y0, z0) of the launch site at transmission time t1 to monitor satellites passing through vicinities, in consideration of the time delay until the transmission of the launch detection information. The monitor satellites may diagonally view the launch site from afar and thus flight positional coordinates of the monitor satellites and the positional coordinates (x0, y0, z0) of the launch site are different. As for the monitor satellites passing through the vicinities, flight positions of the monitor satellites capable of monitoring the vicinities of (x0, y0, z0) may be scattered over a broad area, as a result of diagonal viewing. Accordingly, the flying object information is transmitted via the communication satellite to a great number of monitor satellites and monitor satellites thereamong having detected the high-temperature object are enabled to perform the tracking and monitoring.

The flying object coping system 401 tracks the flying object by iterating operation of acquiring subsequent flying object information while similarly transmitting the flying object information, from a monitor satellite having further acquired tracking monitoring information, to monitor satellites passing through the vicinities.

Prediction of the direction of the flight of the flying object is enabled by time-series sequencing of positional coordinates of the tracked and monitored flying object and is defined as a function of the flight path prediction device 803.

Incidentally, in case of a ballistic missile, a prediction result for an impact site of the missile making a ballistic flight is obtained easily and uniquely. For HGV, which may iterate intermittent jetting, by contrast, landing prediction involves difficulty and only prediction of the flight path can be made to utmost. Therefore, output of the flight path prediction device 803 is generated as a function of time and positional coordinates in future.

Spray at time of launch of a flying object causes diffusion of high-temperature atmosphere and thus can be monitored easily. By contrast, a main body of a flying object in a post-boost phase after stoppage of jetting has a small solid angle in a view from a monitor satellite and temperature increase thereon is not as remarkable as that on the plume. Therefore, there is a fear that the main body of the flying object in the post-boost phase after the stoppage of jetting, mixed with background land information, may be made unidentifiable. Accordingly, the main body of the flying object having increased in temperature is monitored in a background of deep space by a monitoring method called limb observation directed to the earth periphery. Thus, the flying object is made monitorable without being buried in noises. By unification of the flying object information, resulting from detection of a high-temperature target by a plurality of monitor satellites, by the flight path prediction device and analysis of time-series changes in the positional information, the flying object can be tracked and prediction of the flight path is enabled.

Even if a traveling direction is altered by intermittent rejetting during flight, coping with HGV is enabled by tracking by the flight path prediction device 803 and continuous acquisition of the time-series information.

As the coping assets 801, there are various means such as aircrafts, ships, and vehicles deployed in land, sea, and air or ground-based equipment. Further, there is means to directly transmit information to an individual asset. In case of transmission via a system not dedicated to security maintenance as the satellite information transmission system, however, positional information of an individual asset may be undisclosable due to restrictions in security. Therefore, it is rational to aggregate the flying object information in the coping ground center to reach orders to the coping assets and to issue the orders to the coping assets from the coping ground center.

Such a mobile object as a ship having communication lines to the coping assets on dedicated lines may assume a role of the coping ground center, for instance.

Description of Effects of Present Embodiment

In the present embodiment, the flying object coping system 401 includes the monitoring ground center to control a monitor satellite cluster of the monitoring system and to dominate the satellite information transmission system that is a communication system.

The monitoring ground center operates and controls the monitor satellite cluster by transmitting order commands to only the monitor satellite cluster and the satellite information transmission system operates and controls the communication satellite cluster by transmitting order commands. After a monitor satellite detects launch of a flying object, conveyance of positional coordinates is required in order for a monitor satellite cluster flying in the vicinities to continue acquiring the information on the flying object. According to the monitoring ground center, monitor orders can be given to the monitor satellite cluster via a communication satellite passing through the vicinity.

Herein, hardware included in computers of devices such as the satellite constellation formation system 600 to form the satellite constellation 20, the ground installation 700, or the satellites 30 will be described. The description will be given with use of the ground installation 700 illustrated in FIG. 2, for instance.

The processor 910 is a device to execute a program that fulfils functions of each device.

The processor 910 is an IC (Integrated Circuit) to carry out arithmetic processing. Specific examples of the processor 910 are a CPU (Central Processing Unit), a DSP (Digital Signal Processor), and a GPU (Graphics Processing Unit).

The memory 921 is a storage device to temporarily store data. A specific example of the memory 921 is an SRAM (Static Random Access Memory) or a DRAM (Dynamic Random Access Memory).

The auxiliary storage device 922 is a storage device to archive data. A specific example of the auxiliary storage device 922 is an HDD. Further, the auxiliary storage device 922 may be a portable storage medium such as SD (registered trademark) memory card, CF, NAND flash, flexible disk, optical disk, compact disc, Blu-ray (registered trademark) disc, or DVD. Incidentally, HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected to an input device such as a mouse, a keyboard, or a touch panel. Specifically, the input interface 930 is a USB (Universal Serial Bus) terminal. Incidentally, the input interface 930 may be a port to be connected to a LAN (Local Area Network).

The output interface 940 is a port to which a cable of display equipment 941 such as a display is connected. Specifically, the output interface 940 is a USB terminal or an HDMI (registered trademark) (High Definition Multimedia Interface) terminal. The display is an LCD (Liquid Crystal Display), specifically.

The communication device 950 includes a receiver and a transmitter. Specifically, the communication device 950 is a communication chip or an NIC (Network Interface Card).

The program that fulfils the functions of each device is read into the processor 910 and is executed by the processor 910. In the memory 921, not only the programs but an OS (Operating System) is stored. The processor 910 executes the program while executing the OS. The programs and the OS may be stored in the auxiliary storage device 922. The programs and the OS that are stored in the auxiliary storage device 922 are loaded into the memory 921 and are executed by the processor 910. Incidentally, a portion or all of the programs that fulfil the functions of the devices may be integrated into the OS.

The devices each may include a plurality of processors that substitute for the processor 910. The plurality of processors share execution of the program. Each of the processors is a device to execute a program, as with the processor 910.

Data, information, signal values, and variable values that are utilized, processed, or outputted by the programs are stored in the memory 921, the auxiliary storage device 922, or a register or a cache memory in the processor 910.

The "unit" of each unit of the devices may be read as "process", "procedure", "means", "phase", "circuitry", or "step". Further, the "unit" of each unit of the devices may be read as "program", "program product", or "computer-readable recording medium having a program recorded therein". The "process", "procedure", "means", "phase", "circuitry", or "step" may be read as one another.

Embodiment 2

As for the present embodiment, differences from Embodiment 1 and additions to Embodiment 1 will be described chiefly.

Configurations of the present embodiment that have functions similar to functions of Embodiment 1 are provided with identical reference characters and description thereof is omitted.

In the present embodiment, functions of the flight path prediction device 803 will be described with use of FIG. 9.

<Function Example 1 of Flight Path Prediction Device 803>

In case where a monitor satellite 307 including the plurality of monitoring devices detects a significant high-temperature target, the monitor satellite 307 transmits the detected flying object information (monitoring information on the flying object) to the monitoring ground center 810 via the satellite information transmission system 403 including the plurality of communication satellites 308. Herein, time information, a monitor satellite ID, a monitoring device ID, and monitoring data are included in the flying object information (monitoring information on the flying object).

The flight path prediction device 803 included in the monitoring ground center 810 derives positional information on and a traveling direction of the monitor satellite with the relevant ID and a line of sight of the monitoring device with the relevant ID at detection time in the flying object information (monitoring information on the flying object). Then the flight path prediction device 803 extracts a luminance of the high-temperature target from the monitoring data and derives a view vector directed to the high-temperature object, as the flying object information. The monitoring ground center 810 transmits the flying object information via the satellite information transmission system 403 to the coping ground center 802.

The flight path prediction device 803 sequences the view vectors to the high-temperature object, derived from the flying object information (monitoring information on the flying object) from a plurality of monitor satellites 307, in chronological order in the earth fixed coordinate system and predicts positional coordinates of the flying object with temporal transition based on principles of aerial triangulation.

In case where a plurality of flying objects are launched at short time intervals, the flight path prediction device 803 unifies the flying object information (monitoring information on the flying object) acquired from a plurality of monitor satellites 307 and determines that a flying object whose path has been predicted is found to be a plurality of different flying objects.

In a monitoring device directed in a geocentric direction, a bright point detected at center is information that launch of a high-temperature object is detected. Accordingly, it is found that the launch site of the flying object is located immediately beneath the monitor satellite. The positional coordinates of the launch site can be derived, providing that the flight positional coordinates of the monitor satellite at the time of the detection of the launch is monitored.

By contrast, a bright point of a high-temperature target detected at a position remote from the center of a broad monitoring viewing field range of a monitoring device directed in the geocentric direction is remote from positional coordinates immediately beneath the monitor satellite, based on conversion into positional coordinates on a surface of ground. For derivation of the launch site of the flying object, therefore, the positional coordinates and the traveling direction of the monitor satellite at the time of the detection of the launch are checked, the view vector to the bright point captured by the monitoring device is converted, and the positional coordinates of the flying object are derived as an intersection point between the view vector originating from the monitor satellite and the surface of the ground.

As for prediction of a flight path of a flying object that continues jetting right after detection of the launch, tracking of the flying object is enabled by unification of the information from the monitoring devices included in monitor satellites flying in the vicinities and directed in the geocentric direction.

While a launch site on the surface of the ground can be derived from the flying object information from one monitor satellite, flying object positional coordinates of a flying object flying in air need to be derived based on the principles of aerial triangulation in views from a plurality of satellites. Providing that two monitor satellites having positional coordinates already known simultaneously monitor a flying object as a high-temperature target, IDs of the monitoring devices and view vectors to a bright point in viewing fields of the monitoring devices are converted so that the positional coordinates of the flying object can be derived as an intersection point of the view vectors from the two monitor satellites based on the principles of aerial triangulation.

In case where a time lag exists in monitoring timing of the two monitor satellites, however, inference with compensation for satellite traveling due to the time lag is required. In case where the view vectors do not intersect because of an error cause as well, the error cause is inversely estimated based on an assumption that the view vectors intersect, on a premise that the monitoring information concerns the same flying object. In the flight path prediction device, the flying object information acquired from the plurality of monitor satellites and including those uncertainties is unified and a position identification based on the principles of aerial triangulation is made. Further, in case where detections of a high-temperature object by a plurality of monitor satellites differ in clock time, the compensation for satellite traveling corresponding to a time difference is made and then the positional coordinates of the flying object are predicted.

As for a monitor satellite including a monitoring device that does limb monitoring directed to the earth periphery, there is a long distance between flight positional coordinates of the satellite upon detection of a high-temperature target and positional coordinates of the high-temperature object and the distance is unidentifiable without stereoscopic viewing. Therefore, the positional coordinates of the same flying object are derived with unification of the flying object information from a plurality of monitor satellites flying at separate positions.

As for the prediction of the flight path of a flying object that continues jetting right after the detection of the launch, accordingly, tracking of the flying object is enabled by unification of the information from the monitoring devices included in monitor satellites flying in the vicinities and directed in the geocentric direction. For monitoring of a main body having jetting interrupted and having increased in temperature, however, monitoring with high resolution and high sensitivity in the background of deep space with the limb observation is required. Further, for derivation of the positional coordinates of a flying object through the aerial triangulation by a plurality of monitor satellites, the flying object information from the plurality of monitor satellites flying at positions remote from the positional coordinates at which the launch is detected needs to be unified. Therefore, the flying object information from all the monitor satellites having detected the high-temperature object is unified in the flight path prediction device and the positional coordinates of the flying object are derived following the derivation of the view vectors and inverse estimation of the error cause.

Embodiment 3

As for the present embodiment, differences from Embodiments 1 and 2 and additions to Embodiments 1 and 2 will be described chiefly.

Configurations of the present embodiment that have functions similar to functions of Embodiments 1 and 2 are provided with identical reference characters and description thereof is omitted.

<Above-Equator Satellite System 441>

Figure 10:
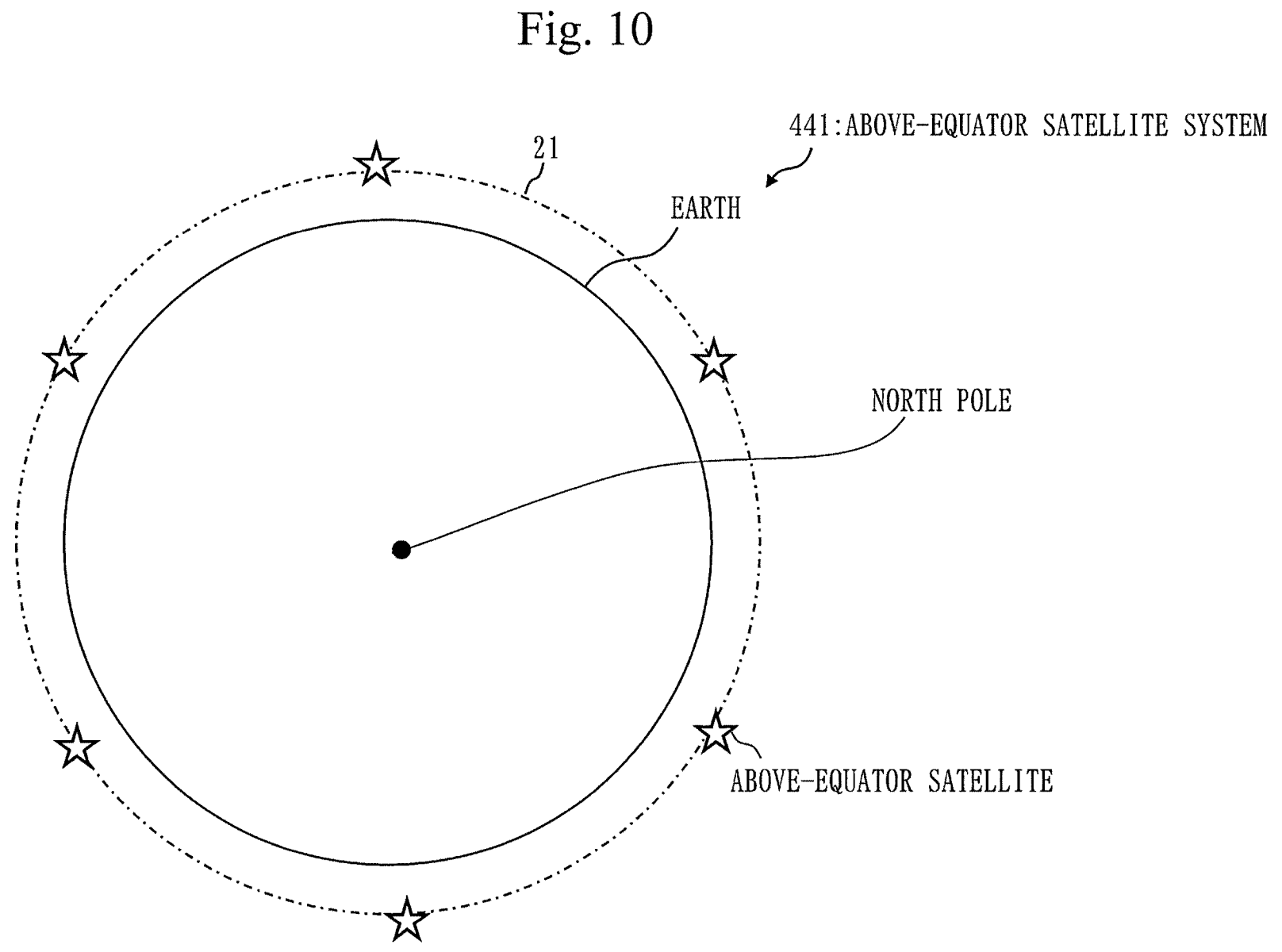

FIG. 10 is a diagram illustrating an example of an above-equator satellite system 441 according to the present embodiment.

The monitoring system 404 includes an above-equator monitor satellite cluster including six or more satellites flying in above-equator orbits that are equal in average orbit altitude. The above-equator satellite cluster forms a communication cross-link with above-equator satellites flying ahead and behind on the same orbit plane. At least one or more above-equator satellites form a communication cross-link with the coping system 405 or the monitoring ground center 810 including the communication route search device 811 for satellite information.

The monitoring system 404 transmits the flying object information to the coping system 405 or the monitoring ground center 810 without intervention of the satellite information transmission system 403.

The above-equator satellite system 441 is made of an above-equator monitor satellite cluster including six or more satellites that are equal in the average orbit altitude and forms a communication cross-link with above-equator satellites flying ahead and behind. At least one or more above-equator satellites form the communication cross-link with the coping system 405 or the monitoring ground center 810 including the communication route search device 811 for the satellite information. Then, the above-equator satellites transmit the flying object information to the coping system 405 or the monitoring ground center 810.

The above-equator satellites configure the above-equator satellite system 441 to transmit the flying object information to the monitoring ground center 810.

In the above-equator monitor satellites, launch of a flying object launched from a vicinity of the equator can be exhaustively detected by the nadir-viewing monitoring devices.

Further, high-temperature spray called plume in launching, which has high temperatures and diffuses through a wide area, can be detected without being buried in noises even within a background of land on the ground. A flying object in the post-boost phase, however, involves necessity to monitor the main body thereof having increased in temperature and has a characteristic in that tracking thereof is made difficult by the temperature that is not as high as the temperature of the plume and a small solid angle.

The limb observation for monitoring of the earth periphery, by contrast, produces an effect in which monitoring of the temperature increase on the main body of HGV in the post-boost phase is thereby enabled because a flying object flying in air above a mid-latitude zone can be monitored in the background of the deep space.

Formation of the communication cross-link by the above-equator satellites with the satellites ahead and behind on the same orbit plane brings about a situation in which simultaneous communication along a ring among all the satellites on the orbit plane is made possible. Therefore, an effect is gained in that the monitoring information on a flying object can be transmitted to the coping system or a ground system (satellite unified ordering center, integrated administration center, monitoring ground center, or the like) without intervention of the satellite information transmission system that is operated as a separate system.

Embodiment 4

As for the present embodiment, differences from Embodiments 1 to 3 and additions to Embodiments 1 to 3 will be described chiefly.

Configurations of the present embodiment that have functions similar to functions of Embodiments 1 to 3 are provided with identical reference characters and description thereof is omitted.

<Polar Orbit Satellite System 442>

Figure 11:
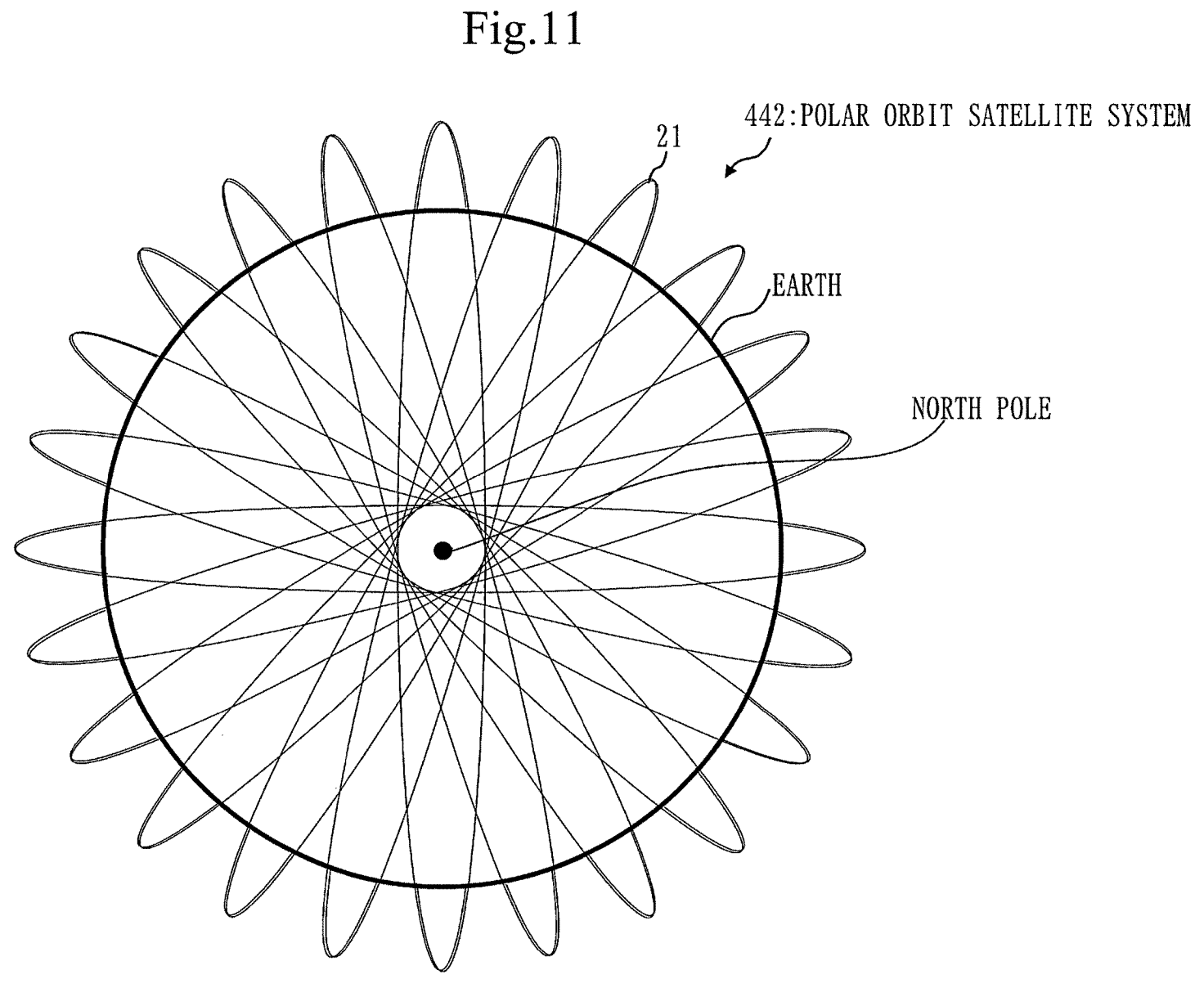

FIG. 11 is a diagram illustrating an example of a polar orbit satellite system 442 according to the present embodiment.

The monitoring system 404 includes a polar orbit satellite cluster including six or more satellites flying in polar orbits that are equal in average orbit altitude on the same orbit plane. The polar orbit satellite cluster forms a communication cross-link with the polar orbit satellites flying ahead and behind. At least one or more polar orbit satellites form a communication cross-link with the coping system 405 or the monitoring ground center 810 including the communication route search device 811 for satellite information.

The monitoring system 404 transmits the flying object information to the coping system 405 or the monitoring ground center 810 without intervention of the satellite information transmission system 403.

The polar orbit satellite system 442 is made of a polar orbit satellite cluster including six or more satellites that are equal in average orbit altitude on the same orbit plane and forms the communication cross-link with polar orbit satellites flying ahead and behind. At least one or more polar orbit satellites form the communication cross-link with the coping system 405 or the monitoring ground center 810 including the communication route search device 811 for the satellite information. Then, the polar orbit satellites transmit the flying object information to the coping system 405 or the monitoring ground center 810.

The polar orbit satellites configure the polar orbit satellite system 442 to transmit the flying object information to the monitoring ground center 810.

The polar orbit satellites pass through polar regions in every round and thus produce an effect in that high-latitude regions in vicinities of the polar regions can be exhaustively monitored by only a satellite cluster formed on a single orbit plane.

In the polar orbit satellites, launch of a flying object launched from a high-latitude region in the vicinity of a polar region can be exhaustively detected by the nadir-viewing monitoring devices.

Further, high-temperature spray called plume in launching, which has high temperatures and diffuses through a wide area, can be detected without being buried in noises even within a background of land on the ground. A flying object in the post-boost phase, however, involves necessity to monitor the main body thereof having increased in temperature and has a characteristic in that tracking thereof is made difficult by the temperature that is not as high as the temperature of the plume and a small solid angle. The limb observation for monitoring of the earth periphery, by contrast, produces an effect in which the monitoring of the temperature increase on the main body of HGV in the post-boost phase is thereby enabled because a flying object flying at a great distance from a polar orbit plane can be monitored in the background of the deep space.

Formation of the communication cross-link by the polar orbit satellites with the satellites ahead and behind on the same orbit plane brings about a situation in which simultaneous communication along a ring among all the satellites on the orbit plane is made possible. Therefore, an effect is gained in that the monitoring information on a flying object can be transmitted to the coping system or a ground system (satellite unified ordering center, integrated administration center, monitoring ground center, or the like) without intervention of the satellite information transmission system that is operated as a separate system.

Embodiment 5

As for the present embodiment, differences from Embodiments 1 to 4 and additions to Embodiments 1 to 4 will be described chiefly.

Configurations of the present embodiment that have functions similar to functions of Embodiments 1 to 4 are provided with identical reference characters and description thereof is omitted.

<Inclined Orbit Satellite System 443>

Figure 12:
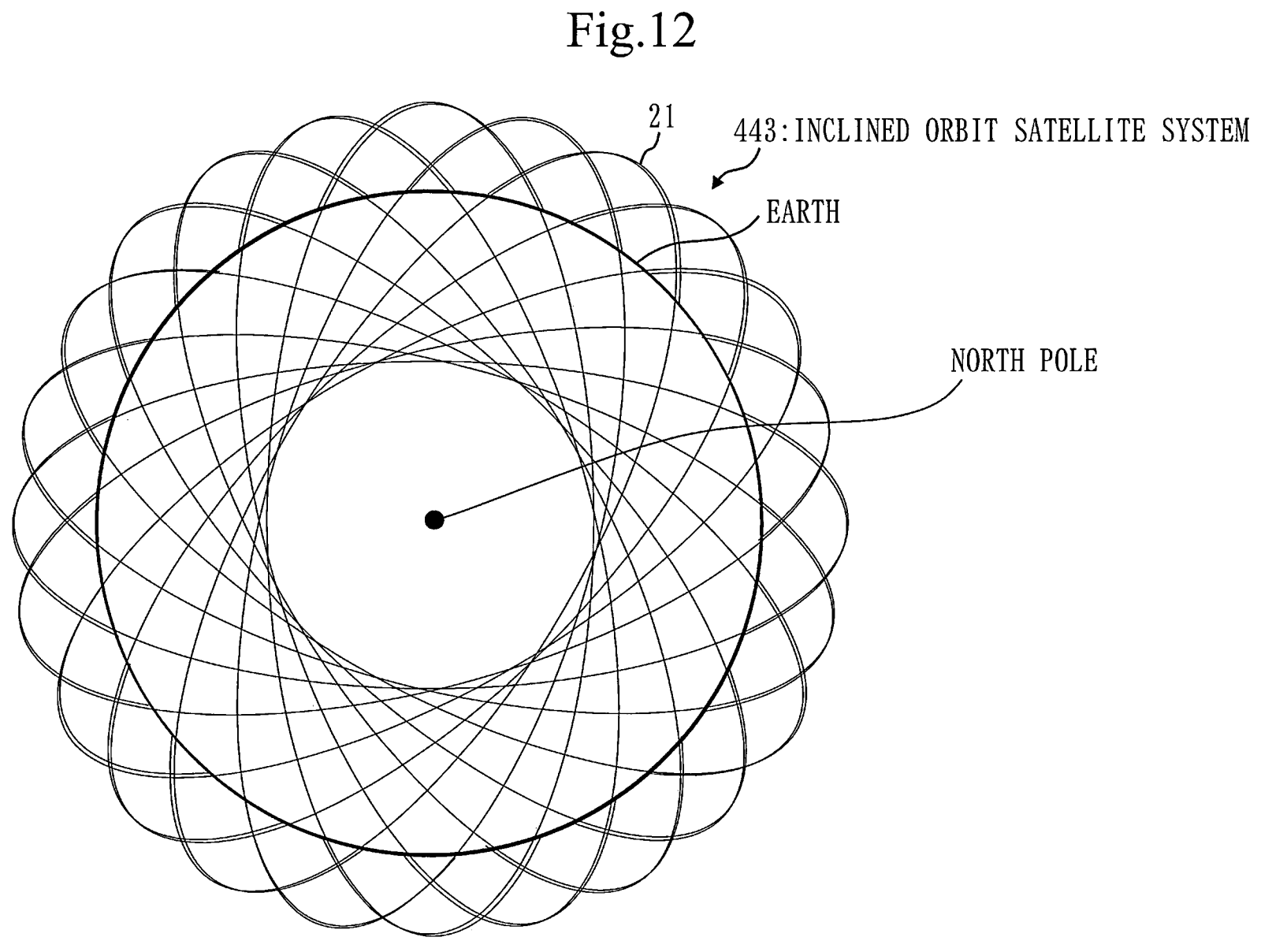

FIG. 12 is a diagram illustrating an example of an inclined orbit satellite system 443 according to the present embodiment.

The monitor satellites 307 that configure the monitoring system 404 include the monitoring devices and the communication devices directed ahead and behind, have the same orbit altitude as the communication system, fly between communication satellites on the same orbit plane, and form a communication cross-link with the communication satellites ahead and behind. Herein, the communication system is the satellite information transmission system, for instance. The monitoring system 404 transmits monitoring information on a flying object to the coping system 405 or the monitoring ground center 810 via the satellite information transmission system 403 included in the flying object coping system 401.

The inclined orbit satellite system 443 is made of a communication satellite cluster flying in inclined orbits in the satellite information transmission system 403 and a plurality of monitor satellites. In the inclined orbit satellite system 443, the monitor satellites include the monitoring devices and the communication devices directed ahead and behind, have the same orbit altitude as the communication satellites, fly between communication satellites on the same orbit plane, and form the communication cross-link with the communication satellites ahead and behind.

Inclined orbit satellites configure the inclined orbit satellite system 443 as described above.

The inclined orbit satellites provide communication services or monitoring services for other than such high-latitude zones as the polar regions (the polar regions can be monitored by the limb observation) and have a merit in that a broad range can be covered within entirety of the earth.

In case where the monitoring system and the communication system are each made of an inclined orbit satellite cluster, however, flight positions of all the satellites change momentarily. On condition that information from a monitor satellite is transmitted via the communication system, therefore, a problem arises in that a communication path at transmission time needs to be determined for each satellite ID so that orders to the satellites may be made troublesome.

Therefore, while a communication cross-link is established between satellites ahead and behind on the same orbit plane, a monitor satellite is interposed between the satellites so that the communication cross-link between ahead and behind is reconfigured. With such a configuration, a ring-like communication environment in the same orbit plane is maintained and the monitoring information is directly transmitted through a communication line. An effect is thereby produced in that the troublesome orders are made unnecessary because a communication path search for each satellite ID is made unnecessary.

Providing that the satellites ahead and behind form a communication cross-link with an adjacent orbit, information transmission including that between adjacent orbits is instantly made possible.

A plurality of portions of Embodiments 1 to 5 above may be implemented in combination. Alternatively, a portion in these embodiments may be implemented. Otherwise, these embodiments may be implemented generally or partially in combination in any manner.

In Embodiments 1 to 5, namely, free combination of any portions of Embodiments 1 to 5, modification of any component, or omission of any component of Embodiments 1 to 5 may be fulfilled.

Incidentally, the embodiments described above intrinsically adduce preferred examples and are not intended for limiting the scope of the present disclosure, the scopes of applications of the present disclosure, and the scopes of uses of the present disclosure. The embodiments described above may be modified in various manners as appropriate.

REFERENCE SIGNS LIST

11, 11*b*: satellite constellation formation unit; 20: satellite constellation; 21: orbit plane; 30: satellite; 31: satellite control device; 32: communication device; 33: propulsion device; 34: attitude control device; 35: power supply device; 36: monitoring device; 55: orbit control command; 307: monitor satellite; 308: communication satellite; 401: flying object coping system; 403: satellite information transmission system; 404: monitoring system; 405: coping system; 441: above-equator satellite system; 442: polar orbit satellite system; 443: inclined orbit satellite system; 510: orbit control command generation unit; 520: analysis prediction unit; 601: flying object; 600: satellite constellation formation system; 700: ground installation; 801: coping asset; 802: coping ground center; 803: flight path prediction device; 804: coping asset selection device; 810: monitoring ground center; 811: communication route search device; 910: processor; 921: memory; 922: auxiliary storage device; 930: input interface; 940: output interface; 941: display equipment; 950: communication device

The invention claimed is:

1. A flying object coping system which tracks a flying object, comprising:

a monitoring system including a plurality of monitor satellites including monitoring devices and communication devices and a monitoring ground center to transmit order commands to a monitor satellite cluster;

a satellite information transmission system including a plurality of communication satellites including communication devices; and a coping system including land, sea, and air coping assets to cope with the flying object, which iterates intermittent jetting, wherein the flying object coping system transmits flying object information, generated by the monitoring system that monitors the flying object, to the coping system via the satellite information transmission system, and the monitoring ground center includes a communication route search device for satellite information and a flight path prediction device and transmits order commands to a communication satellite cluster included in the satellite information transmission system.

2. The flying object coping system according to claim 1, wherein the monitoring system includes a plurality of monitor satellites including infrared monitoring devices, detects plume at time of launch of the flying object and the flying object flying with increase in temperature even when jetting is interrupted, as high-temperature targets, and transmits time information and positional information as the flying object information.

3. The flying object coping system according to claim 1, wherein the communication satellites included in the satellite information transmission system form a communication network with a cross-link through the communication devices, and the monitoring ground center searches for a shortest route for information transmission with use of the communication route search device, and transmits information transmission orders to communication satellites that are to form a communication path.

4. The flying object coping system according to claim 1, wherein after a monitor satellite A included in the monitoring system detects launch of the flying object, the monitoring ground center transmits launch time and positional coordinates of the flying object as the flying object information to the coping system.

5. The flying object coping system according to claim 1, wherein the monitoring ground center searches for a shortest route in the communication network from positional coordinates where the monitor satellite A has emitted the flying object information to positional coordinates of the coping system with use of the communication route search device and transmits information transmission orders to a communication satellite cluster on a communication path, and the communication satellite cluster on the communication path transmits the launch time and the positional coordinates of the flying object as the flying object information to the coping system, based on the information transmission orders.

6. The flying object coping system according to claim 1, wherein the monitoring ground center transmits the flying object information via the satellite information transmission system to a monitor satellite cluster flying in vicinities of the monitor satellite A after the launch of a flying object, after a monitoring device B detects a high-temperature target, the monitoring ground center searches for a shortest route in the communication network from positional coordinates of a monitor satellite B to the positional coordinates of the coping system with use of the communication route search device, and transmits information transmission orders to a communication satellite cluster on a communication path, and the communication satellite cluster on the communication path transmits detection time, positional coordinates, and luminance information of the high-temperature target, as the flying object information, to the coping system, based on the information transmission orders.

7. The flying object coping system according to claim 6, wherein the monitoring ground center transmits the flying object information via the satellite information transmission system to a monitor satellite cluster flying in vicinities of the monitor satellite B, in case where a monitor satellite C detects a high-temperature target, the monitoring ground center searches for a shortest route in the communication network from positional coordinates of the monitor satellite C to the positional coordinates of the coping system with use of the communication route search device, and transmits information transmission orders to a communication satellite cluster on a communication path, and the communication satellite cluster on the communication path transmits detection time, positional coordinates, and luminance information of the high-temperature target, as the flying object information, to the coping system, based on the information transmission orders.

8. The flying object coping system according to claim 7, wherein the monitoring ground center transmits the flying object information via the satellite information transmission system to a monitor satellite cluster flying in vicinities of a monitor satellite N, in case where a monitor device N+1 detects a high-temperature target, the monitoring ground center searches for a shortest route in the communication network from positional coordinates of a monitor satellite N+1 to the positional coordinates of the coping system with use of the communication route search device, and transmits information transmission orders to a communication satellite cluster on a communication path, and the communication satellite cluster on the communication path transmits detection time, positional coordinates, and luminance information of the high-temperature target, as the flying object information, to the coping system, based on the information transmission orders.

9. The flying object coping system according to claim 1, wherein the monitoring ground center includes a flight path prediction device and generates flight path prediction information including time and positional information in future based on transition of time-series positional information in the flying object information received from the monitoring system.

10. The flying object coping system according to claim 9, wherein the coping system includes a plurality of coping assets and a coping ground center, the coping ground center includes a coping asset selection device and is connected to the coping assets by communication lines, the flight path prediction device included in the monitoring ground center transmits the flight path prediction information via the satellite information transmission system to the coping ground center, and the coping asset selection device included in the coping ground center selects a coping asset existing in a vicinity of positional coordinates at which passage or arrival of a flying object is predicted based on the flight path prediction information, and transmits order signals for coping behavior.

11. The flying object coping system according to claim 10, wherein the flight path prediction device predicts a traveling direction of the flying object and generates the flight path prediction information, based on the positional coordinates of the monitor satellite B, the monitor satellite C, the monitor satellite N, or the monitor satellite N+1 that has detected a high-temperature target after transmission of launch detection information from the monitor satellite A.

12. The flying object coping system according to claim 11, wherein the coping asset selection device selects a coping asset located in a vicinity based on the flight path prediction information from among the plurality of coping assets differing in positional coordinates, and the coping ground center transmits the flying object information and a coping behavior order to the coping asset.

13. The flying object coping system according to claim 1, wherein the coping system includes a plurality of coping ground centers that differ in positional coordinates, and the monitoring ground center transmits the flying object information, based on launch detection by the monitor satellite A, to all the coping ground centers.

14. The flying object coping system according to claim 13, wherein the monitoring ground center transmits the flying object information to the coping ground center located in a vicinity based on the flight path prediction information generated by the flight path prediction device.

15. The monitoring ground center included in the flying object coping system according to claim 1.

16. The communication route search device included in the flying object coping system according to claim 1, wherein the communication route search device uses communication starting time, positional coordinates, and positional coordinates of a destination to which flying object information is to be transmitted, as input conditions, searches for an optimum route in which satellite IDs that are transmission destinations of the flying object information are linked, and produces a list in which the series of satellite IDs and forecast time when relevant satellites are to transmit the flying object information to subsequent satellites are enumerated and commands to provide communication orders for a relevant communication satellite cluster, as products, and searches for an optimum route for transmission of the flying object information in a shortest period of time, with inclusion of prediction errors of an actual orbit relative to a scheduled orbit in flight positions of a communication satellite, prediction time errors in passage through specific positional coordinates, delay resulting from information transmission, a satellite travel distance associated with the prediction errors and delay time, and relative positional changes of vicinity passing satellites resulting from satellite travel in analysis objects for route search.

17. The communication route search device included in the flying object coping system according to claim 6, wherein the communication route search device uses launch detection signals from a monitor satellite as a communication start order, sets positional coordinates of the monitor satellite having emitted the launch detection signals, positional coordinates at which launch of a flying object has been detected, and viewing field alteration ranges for monitor satellites, as input conditions, searches for an optimum route in which satellite IDs that are transmission destinations of the flying object information are linked, and produces a list in which the series of satellite IDs and forecast time when relevant satellites are to transmit the flying object information to subsequent satellites are enumerated and commands to provide communication orders for a relevant communication satellite cluster, as products, and searches for a vicinity passing monitor satellite ID capable of monitoring a vicinity of a launch site of the flying object even with viewing field alteration and makes searches for flying object information transmission time, the monitor satellite ID, and an optimum route for transmission of the flying object information to the monitor satellite ID.

18. The communication route search device included in the flying object coping system according to claim 7, wherein the communication route search device uses launch detection signals from a monitor satellite as a communication start order, sets positional coordinates of the monitor satellite having emitted the launch detection signals, positional coordinates at which launch of the flying object has been detected, and viewing field alteration ranges for monitor satellites, as well as positional coordinates of a monitor satellite having emitted high-temperature detection signals, among vicinity passing monitor satellites to which flying object information has been transmitted, positional coordinates at which a high-temperature object has been detected, and a viewing field alteration range for the monitor satellite, as input conditions, searches for an optimum route in which satellite IDs that are transmission destinations of the flying object information are linked, and produces a list in which the series of satellite IDs and forecast time when relevant satellites are to transmit the flying object information to subsequent satellites are enumerated and commands to provide communication orders for a relevant communication satellite cluster, as products, and searches for a vicinity passing monitor satellite ID capable of monitoring a vicinity of a high-temperature object detected position even with viewing field alteration and makes searches for flying object information transmission time, the monitor satellite ID, and an optimum route for transmission of the flying object information to the monitor satellite ID.

19. The flight path prediction device included in the flying object coping system according to claim 9.

20. A flying object coping system, wherein a monitor satellite that configures the monitoring system includes a monitoring device and a communication device directed toward ahead and behind, has a same orbit altitude as a communication system, flies between communication satellites on a same orbit plane, forms a communication cross-link with communication satellites ahead and behind, and transmits monitoring information on a flying object to the coping system or the monitoring ground center via the satellite information transmission system included in the flying object coping system according to claim 1.

21. An inclined orbit satellite system including a communication satellite cluster to fly in inclined orbits in the satellite information transmission system included in the flying object coping system according to claim 1 and a plurality of monitor satellites, wherein the monitor satellites include monitoring devices and communication devices directed toward ahead and behind, have a same orbit altitude as the communication satellites, fly between communication satellites on a same orbit plane, and form a communication cross-link with the communication satellites ahead and behind.

22. An inclined orbit satellite configuring the inclined orbit satellite system according to claim 21.

23. A flying object coping system which tracks a flying object, wherein in case where a monitor satellite including a plurality of monitoring devices detects a significant high-temperature target, the monitor satellite transmits time information, a monitor satellite ID, a monitoring device ID, and monitoring data on detection, as monitoring information on the flying object, which iterates intermittent jetting, to a monitoring ground center via a satellite information transmission system including a plurality of communication satellites including communication devices, and a flight path prediction device included in the monitoring ground center derives positional information on and a traveling direction of the monitor satellite with the relevant ID and a line of sight of the monitoring device with the relevant ID at detection time in the monitoring information on the flying object, extracts a luminance of the high-temperature target from the monitoring data, derives a view vector directed to a high-temperature object, as the flying object information, and transmits the flying object information via the satellite information transmission system to a coping ground center.

24. The flying object coping system according to claim 23, wherein the flight path prediction device included in the monitoring ground center sequences the view vectors to the high-temperature object, derived from the flying object information from a plurality of monitor satellites, in chronological order in an earth fixed coordinate system and predicts positional coordinates of the flying object with temporal transition based on principles of aerial triangulation.

25. The flight path prediction device included in the flying object coping system according to claim 23, wherein in case where a plurality of flying objects are launched at short time intervals, the flight path prediction device unifies the flying object information acquired from a plurality of monitor satellites and determines that a flying object whose path has been predicted by the flight path prediction device is found to be a plurality of different flying objects.

26. A flying object coping system which tracks a flying object, wherein a monitoring system including a plurality of monitor satellites including monitoring devices and communication devices includes a polar orbit satellite cluster including six or more satellites flying in polar orbits that are equal in average orbit altitude on a same orbit plane, the polar orbit satellite cluster forms a communication cross-link with polar orbit satellites flying ahead and behind, at least one or more polar orbit satellites form a communication cross-link with a coping system including land, sea, and air coping assets to cope with the flying object, which iterates intermittent jetting, or a monitoring ground center including a communication route search device for satellite information, and the monitoring system transmits flying object information to the coping system or the monitoring ground center without intervention of a satellite information transmission system including a plurality of communication satellites including communication devices.

27. A polar orbit satellite system which tracks a flying object, including a polar orbit monitor satellite cluster including six or more satellites that are equal in average orbit altitude on a same orbit plane and forming a communication cross-link with polar orbit satellites flying ahead and behind, wherein at least one or more polar orbit satellites form a communication cross-link with a coping system including land, sea, and air coping assets to cope with the flying object, which iterates intermittent jetting, or a monitoring ground center including a communication route search device for satellite information, and transmit flying object information to the coping system or the monitoring ground center.

28. The polar orbit satellite configuring the polar orbit satellite system according to claim 27, wherein the polar orbit satellite transmits the flying object information to the monitoring ground center.

* * * * *